(12) United States Patent
Lee et al.

(10) Patent No.: US 11,576,028 B2
(45) Date of Patent: Feb. 7, 2023

(54) ELECTRONIC DEVICE AND METHOD FOR PERFORMING RANGING THROUGH UWB

(71) Applicant: SAMSUNG ELECTRONICS CO., LTD., Suwon-si (KR)

(72) Inventors: Mingyu Lee, Suwon-si (KR); Kangjin Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 16/990,557

(22) Filed: Aug. 11, 2020

(65) Prior Publication Data

US 2021/0136556 A1 May 6, 2021

(30) Foreign Application Priority Data

Nov. 1, 2019 (KR) .................. 10-2019-0138776

(51) Int. Cl.
 *H04W 8/00* (2009.01)
 *H04W 76/14* (2018.01)
 (Continued)

(52) U.S. Cl.
 CPC ............... *H04W 8/005* (2013.01); *H04L 1/18* (2013.01); *H04W 56/0045* (2013.01);
 (Continued)

(58) Field of Classification Search
 CPC ........... H04W 56/0045; H04W 64/003; H04W 76/14; H04W 76/15; H04W 76/30;
 (Continued)

(56) References Cited

U.S. PATENT DOCUMENTS

| 7,277,417 B2 | 10/2007 | Palm et al. |
| 7,904,112 B2 | 3/2011 | Bitran et al. |
| | (Continued) | |

FOREIGN PATENT DOCUMENTS

| CN | 109669177 A | 4/2019 |
| WO | 2006/092772 A1 | 9/2006 |
| | (Continued) | |

OTHER PUBLICATIONS

Communication dated Nov. 25, 2020 issued by the International Searching Authority in counterpart Application No. PCT/KR2020/011335 (PCT/ISA/220, PCT/ISA/210, and PCT/ISA/237).

(Continued)

*Primary Examiner* — Hassan A Phillips
*Assistant Examiner* — Hicham B Foud
(74) *Attorney, Agent, or Firm* — Sughrue Mion, PLLC

(57) ABSTRACT

Provided are an electronic device for performing ranging using a ultra-wide band (UWB) communication method and an operation method of the electronic device. An operation method of a first electronic device includes transmitting a connection start message related to a second communication method to a second electronic device by using a first communication method, transmitting an initial connection message by using the second communication method, receiving a ranging start message from the second electronic device, and performing ranging with respect to the second electronic device by using the second communication method.

17 Claims, 12 Drawing Sheets

(51) Int. Cl.
    *H04W 56/00*     (2009.01)
    *H04W 64/00*     (2009.01)
    *H04W 76/15*     (2018.01)
    *H04W 76/30*     (2018.01)
    *H04L 1/18*     (2006.01)

(52) U.S. Cl.
    CPC ......... *H04W 64/003* (2013.01); *H04W 76/14* (2018.02); *H04W 76/15* (2018.02); *H04W 76/30* (2018.02)

(58) Field of Classification Search
    CPC ..... H04W 8/005; H04W 84/18; H04W 4/023; H04W 4/80; H04W 4/70; H04W 88/06; H04L 1/08; H04L 1/18; G01S 13/765; G01S 5/02
    See application file for complete search history.

(56) References Cited

U.S. PATENT DOCUMENTS

| | | | |
|---|---|---|---|
| 10,239,494 B2* | 3/2019 | Spiess | B60R 25/246 |
| 2007/0149124 A1 | 6/2007 | Onozawa | |
| 2009/0055123 A1* | 2/2009 | Razzell | H04W 24/00 |
| | | | 702/159 |
| 2010/0304780 A1 | 12/2010 | Chung et al. | |
| 2016/0277873 A1* | 9/2016 | Park | H04L 25/4906 |
| 2019/0135229 A1* | 5/2019 | Ledvina | H04W 4/023 |
| 2020/0106877 A1* | 4/2020 | Ledvina | H04L 69/18 |
| 2020/0228943 A1* | 7/2020 | Martin | H04W 4/80 |
| 2021/0051532 A1* | 2/2021 | Reddy | H04W 36/0022 |
| 2021/0076163 A1* | 3/2021 | Burowski | H04W 8/005 |

FOREIGN PATENT DOCUMENTS

| | | |
|---|---|---|
| WO | 2008/130127 A1 | 10/2008 |
| WO | 2019/067105 A1 | 4/2019 |

OTHER PUBLICATIONS

LAM/MAN Standards Committee of the IEEE Computer, "P802.15.4z ™/D03 Draft Standard for Low-Rate Wireless Networks Amendment: Enhanced Ultra Wide-Band (UWB) Physical Layers (PHYs) and Associated Ranging Techniques", 2019, IEEE Draft; P802.15.4Z-D3, IEEE-SA, vol. 802.15 EIR drafts 802.15.4z drafts, No. D3, XP068154948, 180 pages total.

Communication dated Jul. 21, 2022 by the European Patent Office for European Patent Application No. 20881544.9.

* cited by examiner

ELECTRONIC DEVICE AND METHOD FOR PERFORMING RANGING THROUGH UWB

CROSS-REFERENCE TO RELATED APPLICATION

This application is based on and claims priority under 35 U.S.C. § 119 to Korean Patent Application No. 10-2019-0138776, filed on Nov. 1, 2019, in the Korean Intellectual Property Office, the disclosure of which is incorporated by reference herein in its entirety.

BACKGROUND

1. Field

The disclosure relates to an electronic device for performing ranging using an ultra-wide band (UWB) communication method and an operation method of the electronic device.

2. Description of Related Art

The Internet is evolving from a human-centered connection network via which humans create and consume information to an Internet-of-Things (IoT) network via which information is exchanged and processed between distributed components such as things. Internet-of-Everything (IoE) technology is also emerging, in which big data processing technology is combined with IoT technology via a cloud server or the like. To implement IoT, technical elements, such as sensing technology, wired/wireless communication and network infrastructures, service interface technology, and security technology, are required. In recent years, research has been conducted on technologies, such as a sensor network, Machine-to-Machine (M2M), and machine-type communication (MTC), for connection between things.

In an IoT environment, intelligent Internet technology (IT) services may be provided to collect and analyze data generated by connected objects to create new value in human life. As existing information technology (IT) and various industries converge and are combined with each other, IoT is applicable to the fields of smart homes, smart buildings, smart cities, smart cars or connected cars, smart grids, health care, smart home appliances, advanced medical services, etc.

With the development of wireless communication systems, various services can be provided and thus, there is demand for a method of effectively providing such services. For example, for medium access control (MAC), a ranging technique for measuring the distance between electronic devices through ultra-wideband (UWB) communication may be used. UWB is a wireless communication technology that uses a very wide frequency band of several GHz or more in a base band without using a radio carrier.

SUMMARY

When an electronic device performs ranging with respect to another electronic device by using an ultra-wide band (UWB) communication method, the electronic device should wake up and wait for UWB communication to identify whether the other electronic device is within a range of UWB ranging. Therefore, when the other electronic device is out of a UWB communication range, a method of reducing power consumption for the electronic device to wait for UWB communication is needed.

Additional aspects will be set forth in part in the description which follows and, in part, will be apparent from the description, or may be learned by practice of the presented embodiments of the disclosure.

According to an embodiment of the disclosure, an operation method of a first electronic device includes transmitting a connection start message related to a second communication method to a second electronic device by using a first communication method, transmitting an initial connection message by using the second communication method, receiving a ranging start message from the second electronic device, and performing ranging with respect to the second electronic device by using the second communication method.

The transmitting of the initial connection message may include repeatedly transmitting the initial connection message at a certain interval by using the second communication method until the first electronic device receives the ranging start message from the second electronic device, and the first electronic device may stop waiting to receive a message by using the second communication method after the transmission of the initial connection message, before the first electronic device transmits a subsequent initial connection message.

The transmitting of the initial connection message may include repeatedly transmitting the initial connection message at a certain interval by using the second communication method, and changing the interval based on a movement of the first electronic device.

The changing of the interval may include reducing the interval based on the movement of the first electronic device, and increasing the interval based on a determination that the first electronic device has not moved for a certain time period.

The transmitting of the initial connection message may include repeatedly transmitting the initial connection message by using the second communication method until the first electronic device receives the ranging start message from the second electronic device, and the initial connection message may include an index indicating a number of times the initial connection message is transmitted.

The second communication method may include a ultra-wide band (UWB) communication method, the first communication method may be a communication method different from the second communication method, and the initial connection message may include at least one of information about a type of a UWB message, UWB ranging session information, or an index indicating a number of times the initial connection message is transmitted.

The connection start message related to the second communication method may include at least one of a message identifier or a session identifier.

The ranging start message may be received by using the first communication method or the second communication method.

The performing of the ranging may include obtaining ranging start timing information from the ranging start message, and transmitting, to the second electronic device, a ranging control message at a point of time determined based on the ranging start timing information, the ranging control message may include a ranging parameter, and the ranging parameter may include a parameter related to at least one of a ranging method, a ranging block structure, or the number of frames to be used for ranging.

The performing of the ranging may include transmitting a first ranging frame to the second electronic device, receiving a second ranging frame from the second electronic device, calculating a propagation time of the second ranging frame from the second electronic device to the first electronic device based on the first ranging frame and the second ranging frame, and calculating a distance between the first electronic device and the second electronic device based on the calculated propagation time.

According to another embodiment of the disclosure, an operation method of a second electronic device includes receiving a connection start message related to a second communication method from a first electronic device by using a first communication method, waiting to receive a message by using the second communication method, transmitting a ranging start message to the first electronic device when the second electronic device receives an initial connection message from the first electronic device by using the second communication method, and performing ranging with respect to the first electronic device by using the second communication method.

The operation method may further include obtaining an index from the initial connection message, comparing the index with a threshold, and determining an operational state of the first electronic device based on a result of the comparing.

The operation method may further include transmitting information indicating the operational state to the first electronic device.

The ranging start message may be transmitted by using the first communication method or the second communication method.

The transmitting of the ranging start message may include transmitting the ranging start message including ranging start timing information to the first electronic device, and stopping waiting to receive a message by using the second communication method for a certain time period determined based on the ranging start timing information, and the performing of the ranging may include receiving a ranging control message from the first electronic device, and obtaining a ranging parameter from the ranging control message.

The performing of the ranging may include transmitting a first ranging frame to the first electronic device, receiving a second ranging frame from the first electronic device, calculating a propagation time of the second ranging frame from the first electronic device to the second electronic device based on the first ranging frame and the second ranging frame, and calculating a distance between the first electronic device and the second electronic device based on the calculated propagation time.

According to another embodiment of the disclosure, a first electronic device includes a communicator, a memory, and at least one processor configured to execute a program stored in the memory to control an operation of the first electronic device, where the at least one processor is further configured to execute the program stored in the memory to control the communicator to transmit a connection start message related to a second communication method to a second electronic device by using a first communication method, transmit an initial connection message by using a second communication method, and receive a ranging start message from the second electronic device; and perform ranging with respect to the second electronic device by using the second communication method.

According to another embodiment of the disclosure, a second electronic device includes a communicator, a memory, and at least one processor configured to execute a program stored in the memory to control an operation of the second electronic device, where the at least one processor is further configured to execute the program stored in the memory to control the communicator to receive a connection start message related to a second communication method from a first electronic device by using a first communication method, wait to receive a message by using the second communication method, and transmit a ranging start message to the first electronic device when the second electronic device receives, via the communicator, an initial connection message from the first electronic device by using the second communication method, and perform ranging with respect to the first electronic device by using the second communication method.

According to another embodiment of the disclosure, at least one non-transitory computer-readable recording medium stores a program for executing at least one of the methods described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
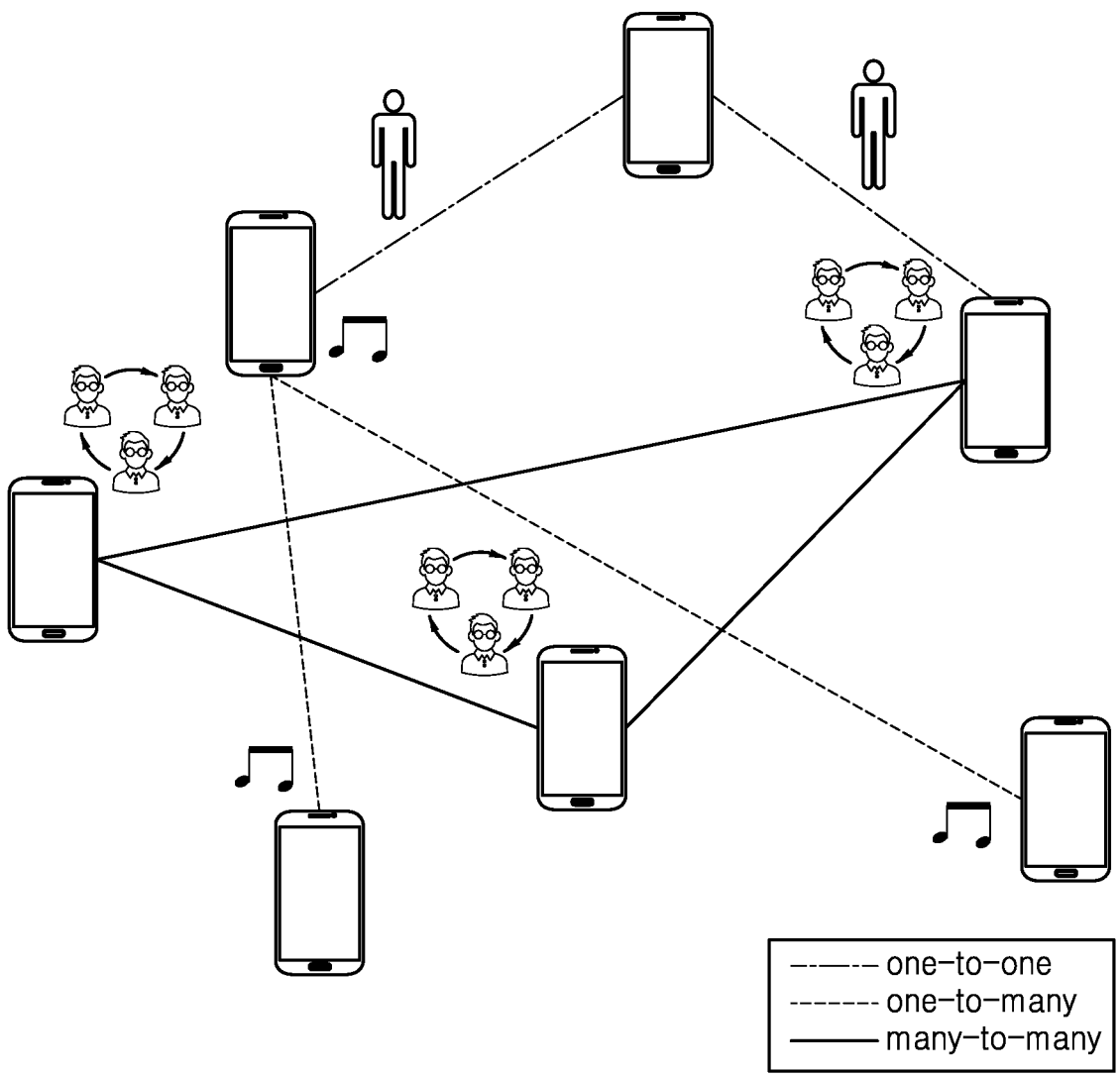
FIG. 1 is a diagram illustrating a general device-to-device (D2D) communication procedure.

Hereinafter, embodiments of the disclosure will be described in detail with reference to the accompanying drawings so that the embodiments of the disclosure may be easily implemented by those of ordinary skill in the art. However, the disclosure may be embodied in many different forms and is not limited to the embodiments of the disclosure set forth herein. For clarity, parts not related to explaining the disclosure are omitted in the drawings and like components are denoted by like reference numerals throughout the specification.

In the disclosure, general terms that have been widely used nowadays are selected in consideration of functions of the disclosure but various other terms may be selected according to the intentions of technicians in the art, precedents, or new technologies, etc. Accordingly, the terms used herein should be defined not based on the names thereof but based on the meanings thereof and the whole context of the disclosure.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, and the like.

In the disclosure, a controller may also be referred to as a processor.

In the disclosure, a layer (or a layer apparatus) may also be referred to as an entity.

Terms such as first and second may be used to describe various components but the components should not be limited by the terms. These terms are only used to distinguish one component from another.

The terms used herein are for the purpose of describing certain embodiments of the disclosure only and are not intended to be limiting of the disclosure. As used herein, the singular expressions are intended to include plural forms as well, unless the context clearly dictates otherwise. Throughout the specification, when an element is referred to as being "connected" to another element, it will be understood to include that the element is "directly connected" to the other element or is "electrically connected" to the other element with another element therebetween. It will be understood that when an element is referred to as "including" another element, the element may further include other elements unless mentioned otherwise.

As used herein, "the" and similar referents may be used to indicate both singular and plural forms. When there is no description explicitly specifying an order of operations of a method according to the disclosure, the operations may be performed in an appropriate order. The disclosure is not limited to the order of the operations described.

The expression "in one embodiment" and the like appearing in various parts of the specification are not intended to refer to the same embodiment.

One embodiment of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing.

In addition, lines or members connecting elements illustrated in the drawings are merely illustrative of functional connections and/or physical or circuit connections. In an actual device, the connections between components may be represented by various functional connections, physical connections, or circuit connections that are replaceable or added.

In general, wireless sensor network technology is largely classified into wireless local area network (WLAN) and wireless personal area network (WPAN) according to a distance identified. In this case, WLAN is an IEEE 802.11-based technology for connection to a backbone network within a radius of 100 m. WPAN is a technology based on IEEE 802.15, and examples thereof include Bluetooth, ZigBee, ultra-wide band (UWB), and the like. A wireless network in which such wireless network technology is implemented may be composed of a plurality of communication electronic devices. In this case, the plurality of communication electronic devices establish communication in an active period using a single channel. That is, the plurality of communication electronic devices may collect and transmit packets in the active period.

UWB may refer to a short-range high-speed wireless communication technology using a wide frequency band of several GHz or more, low spectral density, and a short pulse width (1 to 4 nsec) in a baseband state. UWB may be understood as a band to which UWB communication is applied. A ranging method performed between electronic devices will now be described based on a UWB communication method, but the UWB communication method is only an example and various wireless communication technologies may be used in practice.

Electronic devices according to embodiments of the disclosure may include a fixed user equipment (UE) embodied as a computer device or a mobile UE, and may communicate with other devices and/or servers using a wireless or wired communication method. For example, the electronic devices may include, but are not limited to, a smart phone, a mobile terminal, a laptop computer, a digital broadcasting terminal, a personal digital assistant (PDA), a portable multimedia player (PMP), a navigation device, or a slate PC, a tablet PC, a digital TV, a desktop computer, a refrigerator, a projector, a car, a smart car, a printer, and the like.

Hereinafter, the disclosure will be described in detail with reference to the accompanying drawings.

FIG. 1 is a diagram illustrating a general device-to-device (D2D) communication procedure.

D2D communication refers to a way in which geographically adjacent electronic devices communicate directly with each other without via an infrastructure such as a base station. As illustrated in FIG. 1, electronic devices may communicate in a one-to-one manner, a one-to-many manner, or a many-to-many manner. In D2D communication, unlicensed frequency bands such as Wi-Fi Direct and Bluetooth may be used. Alternatively, in D2D communication, licensed frequency bands may be used to improve frequency utilization efficiency of cellular systems. Although D2D communication is restrictively used to refer to M2M communication or machine intelligent communication, in the disclosure, D2D communication is intended to refer to not only communication between electronic devices having a communication function but also communication between various types of electronic devices having a communication function, such as smart phones or personal computers.

Figure 2:
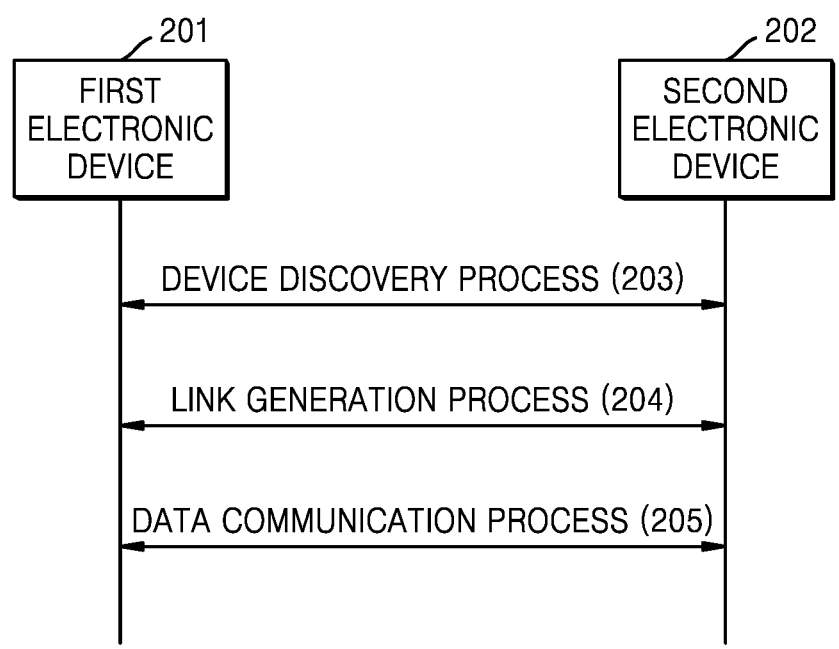
FIG. 2 is a diagram illustrating a process of communication between a plurality of electronic devices.

FIG. 2 is a diagram illustrating a process of communication between a plurality of electronic devices.

A first electronic device 201 and a second electronic device 202 may establish communication through a device discovery process 203, a link generation process 204, and a data communication process 205.

In the device discovery process 203, each of the first electronic device 201 and the second electronic device 202 may search for other electronic devices capable of establishing D2D communication among neighboring electronic devices. Thus, each of the first electronic device 201 and the second electronic device 202 may determine whether to create a link for D2D communication. For example, the first electronic device 201 may transmit a discovery signal to the second electronic device 202 so that the second electronic device 202 may search for the first electronic device 201. In addition, the first electronic device 201 may receive a discovery signal transmitted from the second electronic device 202 to identify that other electronic devices capable of establishing D2D communication are within a D2D communication range.

In the link generation process 204, each of the first electronic device 201 and the second electronic device 202 may create a link for data transmission with an electronic device, which is to transmit data, among the electronic devices searched for in the device discovery process 203. For example, the first electronic device 201 may create a link for data transmission with the second electronic device 202 searched for in the device discovery process 203.

In the data communication process 205, each of the first electronic device 201 and the second electronic device 202 may transmit data to and receive data from the devices for which the link for data transmission is created in the link generation process 204. For example, the first electronic device 201 may transmit data to and receive data from the second electronic device 202 through the link created in the link generation process 204.

Various embodiments of the disclosure relate to medium access control (MAC) based on D2D communication described above, and it is necessary to measure the distance between electronic devices for MAC. In this case, UWB ranging technology may be used to measure the distance between the electronic devices.

An electronic device according to an embodiment of the disclosure may first set up a communication connection using a certain communication method (e.g., Bluetooth, Wi-Fi or the like) and then exchange parameters necessary for UWB communication through the communication method. For example, the parameters necessary for UWB communication may include a channel number, a preamble code index, a physical layer (PHY) parameter set, a session ID, a MAC address, and the like. An electronic device may set up a UWB communication environment according to parameters exchanged with another electronic device and thereafter perform UWB ranging.

A case of exchanging UWB ranging parameters through Bluetooth communication before performing UWB ranging will be described as an example. However, various embodiments of the disclosure are not limited thereto and various communication methods may be used.

In one embodiment of the disclosure, an electronic device performing UWB ranging may activate only a Bluetooth communication module and deactivate a UWB communication module when another electronic device enters a Bluetooth communication range. The electronic device may start UWB ranging when the UWB communication module is activated.

In one embodiment of the disclosure, for UWB ranging, the electronic device may transmit a ranging control message (RCM) and a ranging initiation message, wait to receive a response message for a certain time period, and thereafter transmit a ranging end message. When another electronic device is located outside a UWB ranging range, the electronic device cannot receive a response message from the other electronic device. In this case, the electronic device may repeatedly activate the UWB communication module and perform ranging at certain intervals until a response message is received from another electronic device. When another electronic device is located within the UWB ranging range, the electronic device may receive a response message from the other electronic device. The electronic device may perform UWB ranging by exchanging messages with the other electronic device.

Figure 3A:
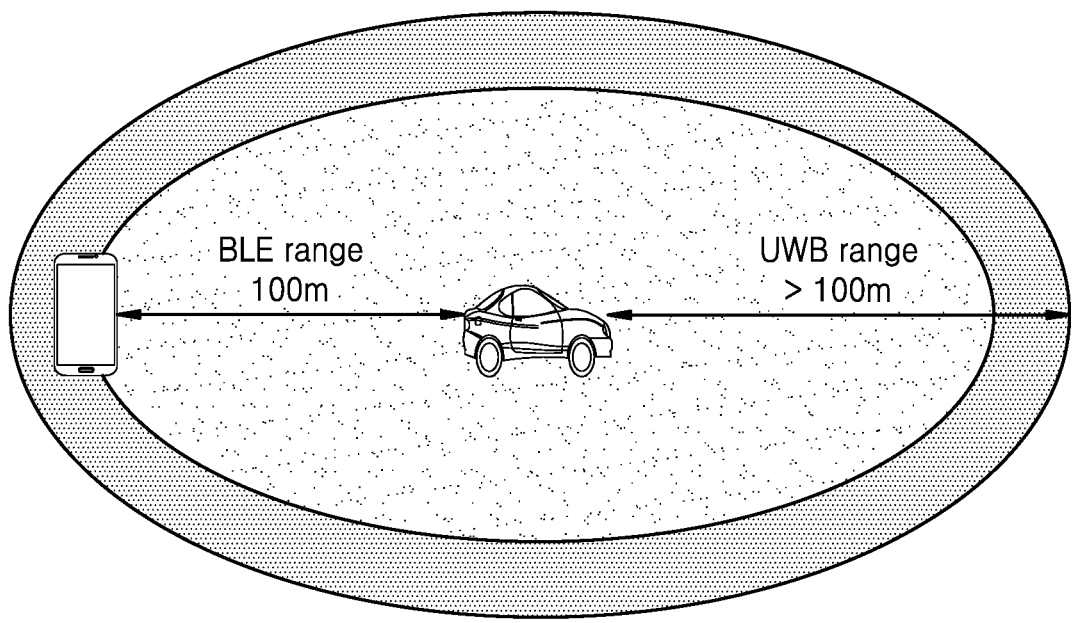
FIG. 3A illustrates a communication range of a general Bluetooth communication method and a communication range of a ultra-wide band (UWB) communication method.

FIG. 3A illustrates a Bluetooth communication range and a UWB communication range.

As illustrated in FIG. 3A, when there are no obstacles between electronic devices, a communication distance using a Bluetooth communication method is about 100 m and a communication distance using a UWB communication method may be greater than 100 m.

Figure 3B:
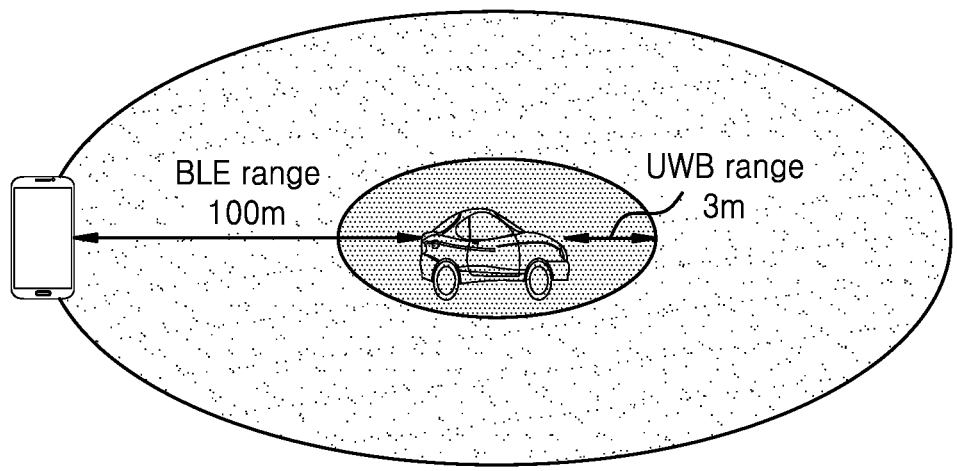
FIG. 3B illustrates a case in which the communication range of the UWB communication method is narrower than the communication range of the Bluetooth communication method.

However, the UWB communication method has relatively low performance of penetrating an object compared to that of the Bluetooth communication method. For example, when a smart phone storing a digital key of a car is located in a pocket of a user's pants, a UWB communication distance between the smartphone and the car may be far less than a Bluetooth communication distance between the smartphone and the car. As illustrated in FIG. 3B, a distance in which the UWB communication is available may be very short, e.g., 3 m. In this case, the difference between the Bluetooth communication distance and the UWB communication distance may be about 97 m. Assuming that a user of a smartphone is walking at a speed of 1.4 m/s, the smartphone and the car may be out of a UWB communication range for about 70 seconds.

Therefore, the electronic device repeatedly activates a UWB module and perform ranging at certain intervals for a considerably long time period, thus causing power waste, until another electronic device enters the UWB communication range after entering the Bluetooth communication range.

Figure 4:
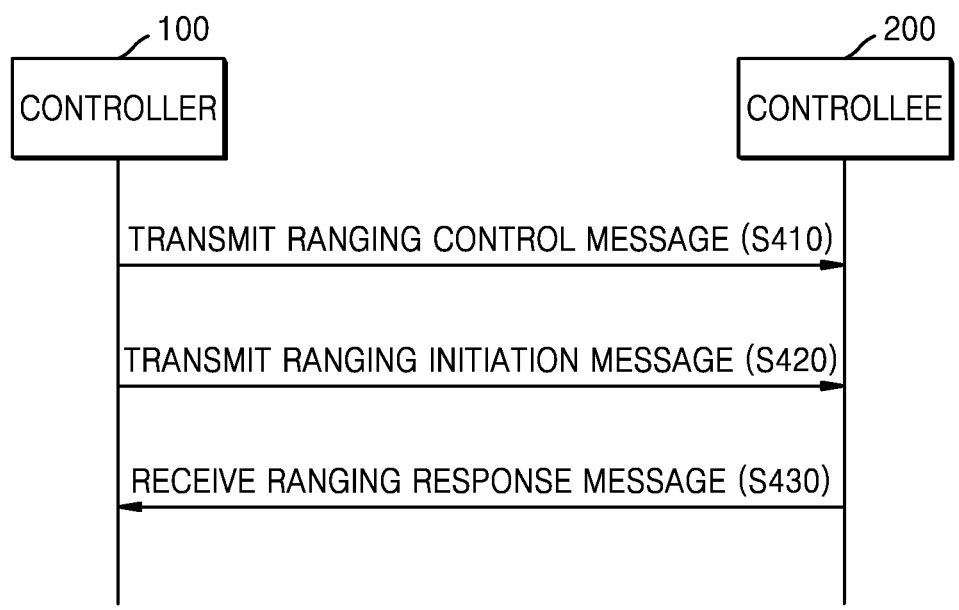
FIG. 4 illustrates an operation method of a UWB ranging system including a controller and a controllee.

FIG. 4 illustrates an operation method of a UWB ranging system including a controller and a controllee.

When ranging is performed between two electronic devices, one of the two electronic devices may be a controller and the other may be a controllee. In operation S410, a controller 100 may control ranging by transmitting a ranging control message to a controllee 200 and define ranging parameters. The ranging control message may be a data frame that carries an Advanced Ranging Control IE (ARC IE). The controllee 200 may be a device that uses the ranging parameters in the ranging control message received from the controller 100.

In operation S420, the controller 100 may transmit a ranging initiation message to the controllee 200. The ranging initiation message may be a first message transmitted to initiate a ranging exchange.

In operation S430, the controllee 200 may transmit a ranging response message to the controller 100, in response to the ranging initiation message received from the controller 100.

A device transmitting a ranging initiation message may be referred to as an initiator, and a device responding to the ranging initiation message may be referred to as a responder. One of the controller 100 and the controllee 200 may be an initiator and the other may be a responder according to the ranging control message transmitted from the controller 100. Although FIG. 4 illustrates a case in which the controller 100 is an initiator as an example, embodiments of the disclosure are not limited thereto. The controllee 200 may be an initiator, and the controller 100 may be a responder.

Figure 5:
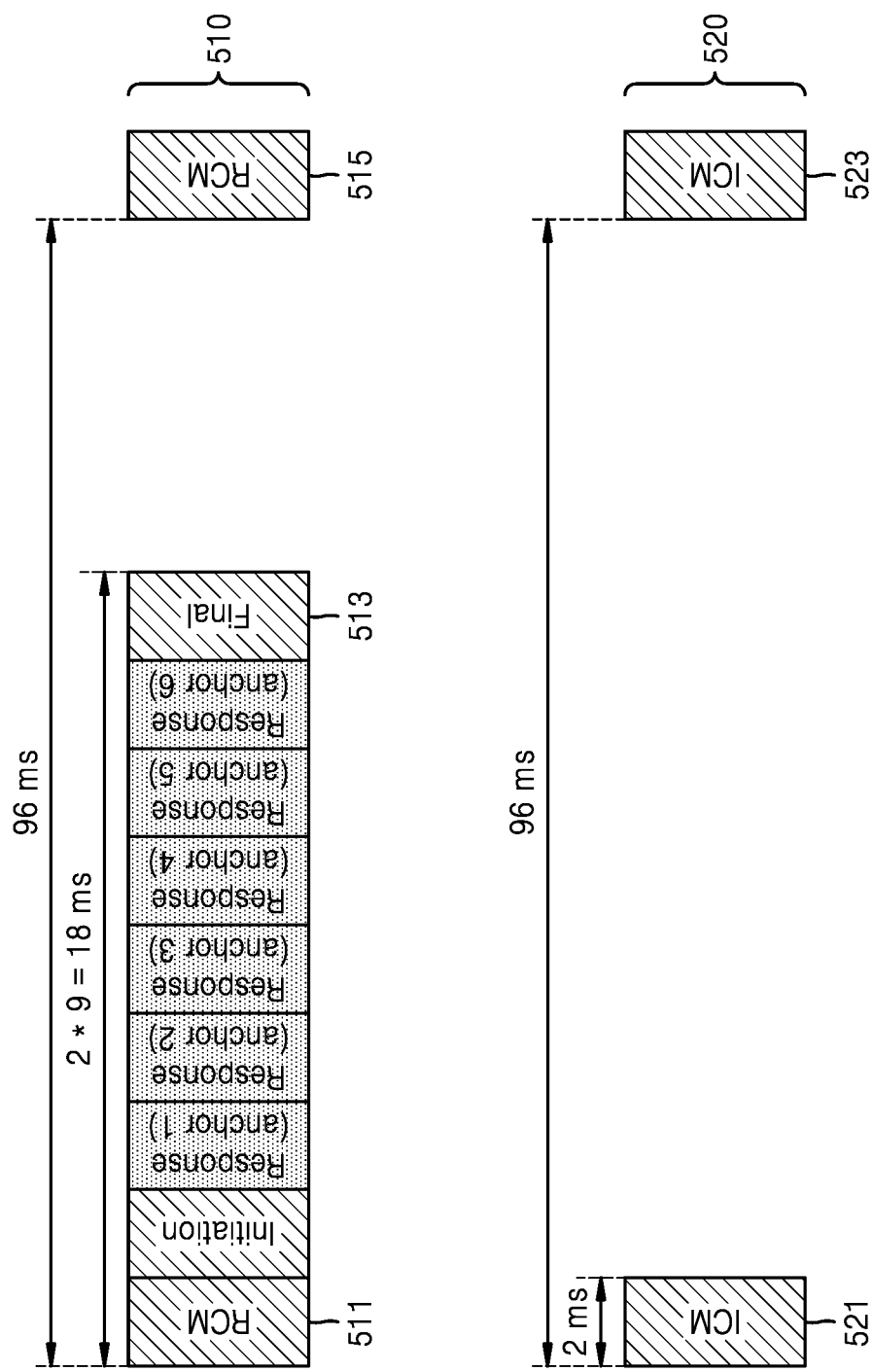
FIG. 5 is a diagram for explaining a method of transmitting an initial connection message by a controller to reduce power waste outside a UWB range, according to an embodiment of the disclosure.

The controller 100 according to an embodiment of the disclosure may repeatedly perform a ranging round shown in a time diagram 510 of FIG. 5 to perform UWB ranging. For a ranging round, the controller 100 may transmit a ranging control message 511, transmit a ranging initiation message, wait to receive a response message from another electronic device, and transmit a ranging end message 513. The controller may start a next ranging round by transmitting a ranging control message 515.

When the controllee 200 is located outside a UWB communication range, the controller 100 cannot receive any response message from the controllee 200. Nevertheless, when the controllee 200 is outside the UWB communication range, the controller 100 repeatedly performs the ranging round shown in the time diagram 510 and waits to receive a response message, thus causing unnecessary power waste. For example, a ratio of a duty cycle in which a UWB communication module is awake to perform ranging to a total cycle of 96 ms may be calculated to be18 ms/96 ms=0.18.

Accordingly, before the actual ranging round is started, the controller 100 according to an embodiment of the disclosure may transmit an initial connection message ICM to identify whether another electronic device enters the UWB communication range, thereby reducing a waking time of the UWB communication module of the controller 100. Referring to the time diagram 520 of FIG. 5, the controller 100 may transmit an initial connection message 521 and deactivate the UWB communication module. The controller may start a next ranging round by transmitting an initial connection message 523. For example, the ratio of a duty cycle in which the UWB communication module is awake to transmit the initial connection message 521 to the total cycle of 96 ms may be significantly reduced to 2 ms/96 ms=0.02.

Figure 6:
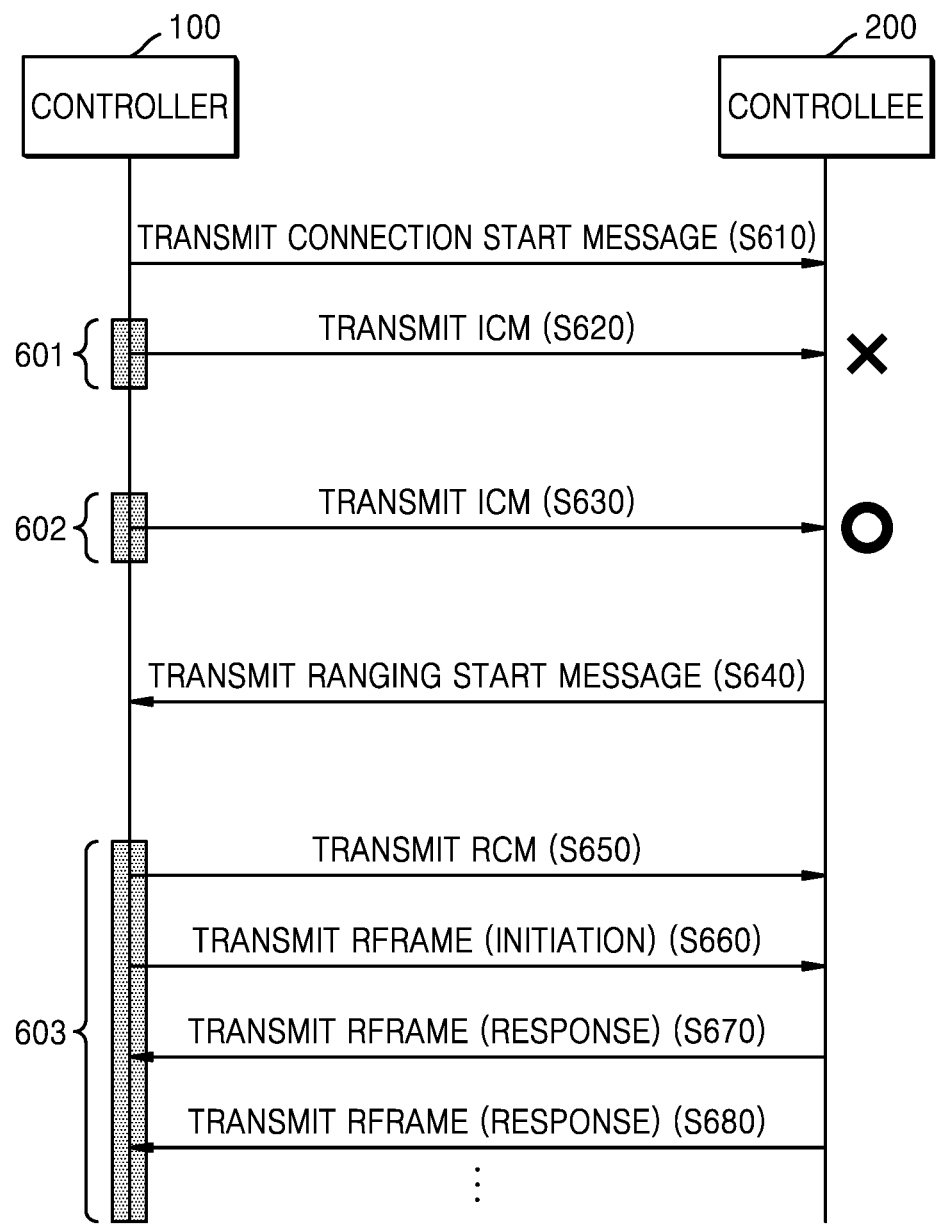
FIG. 6 illustrates an operation method of a controller and a controllee, according to an embodiment of the disclosure.

FIG. 6 illustrates an operation method performed by a controller and a controllee, according to an embodiment of the disclosure.

In operation S610 of FIG. 6, a controller 100 according to an embodiment of the disclosure may transmit a UWB connection start message by using an out-of-band communication method of the UWB communication method. For example, the controller 100 may transmit a connection start message related to UWB communication to a controllee 200 by using a Bluetooth communication method.

In operation S620, the controller 100 according to an embodiment of the disclosure may transmit an initial connection message to the controllee 200. The initial connection message may include session ID information that distinguishes the controller 100 from other devices. In operation S620, the controllee 200 may be located outside the UWB communication range of the controller 100 and thus may not be capable of receiving the initial connection message transmitted in operation S620.

In operation S630, the controller 100 may transmit an initial connection message to the controllee 200. The controller 100 may transmit the initial connection message periodically or aperiodically before receiving a ranging start message from another electronic device.

The controller 100 may receive the ranging start message from the controllee 200 by using a Bluetooth communication method or a UWB communication method.

As one example, when the controller 100 will receive the ranging start message from the controllee 200 by using the Bluetooth communication method, the controller 100 may transmit an initial connection message and deactivate a UWB module until the controller 100 transmits a next initial connection message.

As another example, when the controller 100 will receive the ranging start message from the controllee 200 by using the UWB communication method, the controller 100 may transmit an initial connection message, wait for a certain time period, and deactivate the UWB module. The controller 100 may wait for a certain time period in preparation for receiving the ranging start message by using the UWB communication method in response to the initial connection message. For example, the UWB communication module of the controller 100 may be awake for one slot after the initial connection message is transmitted. The controller 100 may deactivate the UWB module until the controller transmits a next initial connection message after the controller 100 wait for a certain time period.

In operation S640, the controllee 200 according to an embodiment of the disclosure may transmit a ranging start message in response to the initial connection message received in operation S630. As described above, the controllee 200 may transmit the ranging start message by using the Bluetooth method or the UWB method. The ranging start message may include information related to transmission timing of the ranging control message transmitted to start ranging.

The controller 100 receiving the ranging start message may obtain the information related to transmission timing of the ranging control message from the ranging start message. In operation S650, the controller 100 according to an embodiment of the disclosure may transmit the ranging control message at a point in time determined based on timing information obtained from the ranging start message. When receiving the ranging start message, the controller 100 may stop the transmission of the initial connection message and start actual ranging.

For example, in operation S660, when the controller 100 is an initiator of ranging, the controller 100 may transmit an RFRAME (Initiation) to the controllee 200. In operations S670 and S680, the controllee 200 may transmit an RFRAME (Response) to the controller 100 in response to the received RFRAME (Initiation).

As indicated by a time interval 603 in FIG. 6, the controller 100 according to an embodiment of the disclosure may activate the UWB communication module for a relative long time period for performing an actual ranging round when the controllee 200 enters a UWB communication range. However, as indicated by a time interval 601 and a time interval 602 in FIG. 6, the controller 100 according to an embodiment of the disclosure may activate the UWB communication module only for a short time period to transmit the initial connection message when the controllee 200 is located outside the UWB communication range, thereby reducing power waste. As described above with reference to FIG. 5, the time interval 601 and the time interval 602 of FIG. 6 may be about 2 ms and the time interval 603 of FIG. 6 may be about 18 ms.

The controller 100 according to an embodiment of the disclosure may repeatedly transmit an initial connection message to identify whether the controllee 200 is located within the UWB communication range. In this case, a transmission interval of the initial connection message may be adjusted based on a movement of the controller 100.

As the transmission interval of the initial connection message decreases, a delay time for determining whether the controllee 200 is located within the UWB communication range may decrease. In contrast, when the transmission interval of the initial connection message increases, power consumption of the controller 100 may be reduced.

Accordingly, the controller 100 according to an embodiment of the disclosure may reduce the transmission interval of the initial connection message when the movement of the controller 100 is sensed, and increase the transmission interval of the initial connection message when the controller 100 does not move. The movement of the controller 100 may be sensed by a gyro sensor or an acceleration sensor included in the controller 100. In this case, because the controllee 200 is always awake to receive the initial connection message from the controller 100, the controllee 200 may receive the initial connection message even when the transmission interval of the initial connection message is adjusted.

Figure 7:
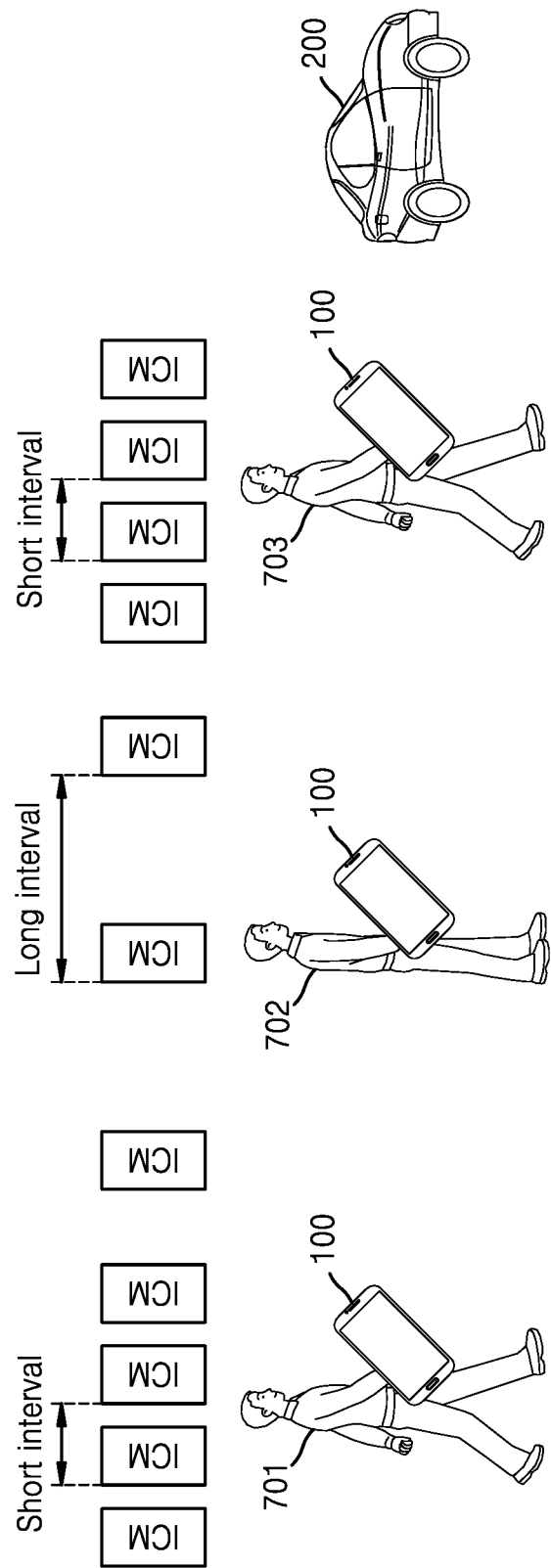
FIG. 7 is a diagram for explaining a method of changing a transmission interval of an initial connection message, according to an embodiment of the disclosure.

FIG. 7 is a diagram for explaining a method of changing a transmission interval of an initial connection message, according to an embodiment of the disclosure.

FIG. 7 illustrates an example in which a controller 100 is a smart phone including a digital key of a car and a controllee 200 is an electronic device included in the car. In FIG. 7, it is assumed that the controller 100 is located in a Bluetooth communication range of the controllee 200 and a connection start message has already been transmitted by the controller 100 via Bluetooth.

When the controller 100 is located at a position 701 of FIG. 7 and a user of the controller 100 is approaching toward the car, the controller 100 may transmit an initial connection message at short time intervals to quickly identify whether the controllee 200 enters the UWB communication range.

When the controller 100 is located at a position 702 of FIG. 7 and the user of the controller 100 stops walking, the controller 100 may transmit the initial connection message at long time intervals to reduce power waste.

When the user of the controller 100 moves again to reach a position 703 of FIG. 7, the controller 100 may transmit the initial connection message at short time intervals to quickly identify whether the controllee 200 enters the UWB communication range.

The UWB communication range may be very narrow when there is a high attenuation of a UWB communication signal due to an obstacle between electronic devices, e.g., when a user uses a smart phone in a pocket. In the case of such a high attenuation situation, it may be required to accurately perform ranging by removing an obstacle, e.g., causing the user to take the smartphone out of the pocket.

Therefore, the controller 100 according to an embodiment of the disclosure may include an index into the initial connection message to sense a high attenuation situation. The controller 100 according to an embodiment of the disclosure may repeatedly transmit the initial connection message such that an index to be included in the initial connection message is increased as a number of times the initial connection message is transmitted increases. In the high attenuation situation, the UWB communication range is far less than the Bluetooth communication range, the controllee 200 may receive the initial connection message a large amount of time after the controller 100 first transmits the initial connection message. Therefore, in this case, an index of the initial connection message received by the controllee 200 may be large.

The controllee 200 may identify the high attenuation situation, based on the index of the received initial connection message. The controllee 200 may inform the controller 100 of a result of the sensing. The controller 100 may be informed of the high attenuation situation from the controllee 200 and notify the user of this situation. For example, when the controller 100 is a smart phone in a user's pocket, the controller 100 may notify the user to take out the smart phone. However, embodiments of the disclosure are not limited to the notifying of the result of the sensing by the controllee 200, and the controllee 200 may perform an appropriate operation, based on the result of identifying the high attenuation situation.

An operation method of each of the controller 100 and the controllee 200 according to an embodiment of the disclosure will be described in detail below. When ranging is performed between two electronic devices, one of the two electronic devices may be a controller and the other may be a controllee. Thus, the controller may be referred to as a first electronic device and the controllee may be referred to as a second electronic device. However, embodiments of the disclosure are not limited thereto, and the controllee may be referred to as a first electronic device and the controller may be referred to as a second electronic device.

Figure 8:
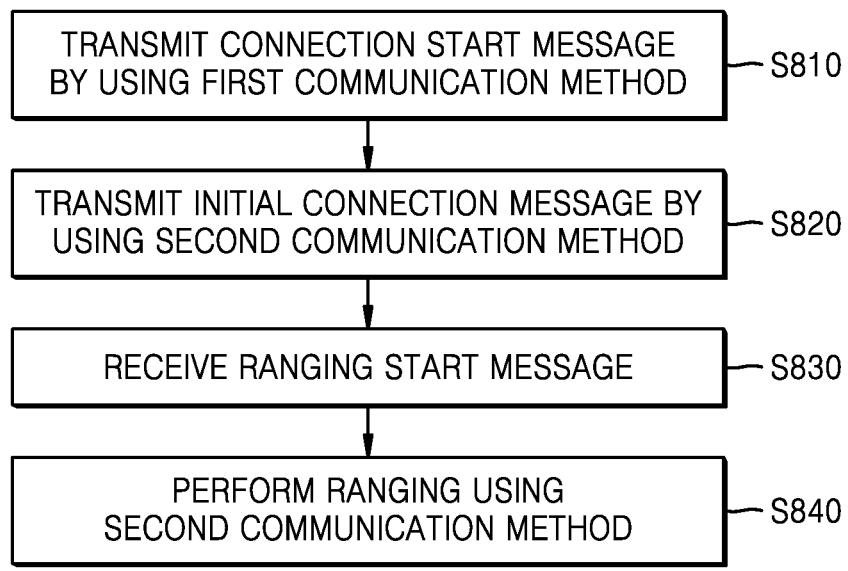
FIG. 8 is a flowchart of an operation method of a controller according to an embodiment of the disclosure.

FIG. 8 is a flowchart of an operation method of the controller 100 according to an embodiment of the disclosure.

In operation S810, the controller 100 according to an embodiment of the disclosure may transmit a connection start message related to a second communication method to the controllee 200 by using a first communication method.

For example, the first communication method may be an out-of-band communication method which is different from the UWB communication method, and the second communication method may be the UWB communication method. For example, the first communication method may be a Bluetooth communication method. The connection start message related to the second communication method may include at least one of a message identifier or a session identifier.

Table 1 below shows a configuration of a connection start message according to an embodiment of the disclosure.

TABLE 1

| Fields | Size (Octets) | Description |
| --- | --- | --- |
| UWB message ID | 1 | Indicator for UWB message type (UWB Connection Start Message) |
| UWB session ID | 4 | Indicator for UWB ranging session |

Referring to Table 1, the connection start message may include a UWB message identifier and a UWB session identifier. The UWB message identifier may indicate information about a type of a UWB message. For example, the UWB message identifier may be an identifier indicating that a corresponding message is a UWB connection start message. The UWB session identifier may be an identifier of a UWB ranging session.

In operation S820, the controller 100 according to an embodiment of the disclosure may transmit an initial connection message by using the second communication method.

The controller 100 according to an embodiment of the disclosure may repeatedly transmit the initial connection message at certain intervals by using the second communication method until a ranging start message is received from the controllee 200.

When the controller 100 repeatedly transmits the initial connection message by using the UWB communication method, an operation of the controller 100 may vary according to whether a communication method of receiving the ranging start message from the controllee 200 is the Bluetooth communication method or the UWB communication method For example, when the controller 100 will receive the ranging start message from the controllee 200 by using the Bluetooth communication method, the controller 100 may transmit the initial connection message and deactivate a UWB module until the controller 100 transmits a next initial connection message. The controller 100 may stop waiting to receive a message by the UWB communication method after the transmission of the initial connection message, before the controller 100 transmits a next initial connection message.

As another example, when the controller 100 will receive the ranging start message from the controllee 200 by using the UWB communication method, the controller 100 may transmit an initial connection message, wait for a certain time period, and deactivate the UWB module. The controller 100 may wait for a certain time period in preparation for receiving the ranging start message in response to the initial connection message. For example, the UWB communication module of the controller 100 may be awake for one slot after the initial connection message is transmitted. The controller 100 may deactivate the UWB module until the controller 100 transmits a next initial connection message after the controller 100 waits for a certain time period.

The controller 100 may repeatedly transmit the initial connection message at fixed transmission intervals or variable transmission intervals. As one example, the controller 100 may change intervals at which the initial connection message is transmitted, based on a movement of the controller 100. For example, the controller 100 may reduce transmission intervals when a movement of the controller 100 is sensed, and increases transmission intervals when it is determined that the controller 100 has not moved for a certain time period.

The controller 100 according to an embodiment of the disclosure may transmit an initial connection message including at least one of information about a type of a UWB message, UWB ranging session information, or an index indicating a number of times the initial connection message is transmitted.

Table 2 below shows a configuration of an initial connection message according to an embodiment of the disclosure.

TABLE 2

| Fields | Size (Octets) | Description |
| --- | --- | --- |
| UWB message ID | 1 | Indicator for UWB message type (ICM) |
| UWB session ID | 4 | Indicator for UWB ranging session |
| ICM index | 2 | Index for ICM, Increment by one after each ICM |

Referring to Table 2, the initial connection message may include a UWB message identifier, a UWB session identifier, and an initial connection message index. The UWB message identifier may indicate information regarding a type of the UWB message. For example, the UWB message identifier may be an identifier indicating that a corresponding message is an initial connection message. The UWB session identifier may be an identifier of a UWB ranging session. The initial connection message index may be increased by 1 whenever the initial connection message is transmitted. The controllee 200 may identify a number of times the received initial connection message is transmitted from the controller 100, based on the index included in the received initial connection message.

In operation S830, the controller 100 may receive a ranging start message from the controllee 200.

The controller 100 may receive the ranging start message from the controllee 200 by using the first communication method or the second communication method.

Table 3 below shows a configuration of a ranging start message according to an embodiment of the disclosure.

TABLE 3

| Fields | Size (Octets) | Description |
| --- | --- | --- |
| UWB message ID | 1 | Indicator for UWB message type (Ranging Start Message) |
| UWB session ID | 4 | Indicator for UWB ranging session |
| Ranging Start Time | 2 | Expect Ranging Start after this message (in the unit of ms) |

Referring to Table 3, the ranging start message may include a UWB message identifier, a UWB session identifier, and ranging start timing information. The UWB message identifier may indicate information about a type of a UWB message. For example, the UWB message identifier may be an identifier indicating that a corresponding message is the ranging start message. The UWB session identifier may be an identifier of a UWB ranging session. The ranging start timing information may include information about a point in time at which ranging is expected to be started after the corresponding message. For example, the ranging start timing information may be expressed in ms units.

In operation S840, the controller 100 according to an embodiment of the disclosure may perform ranging with respect to the controllee 200 by using the second communication method.

The controller 100 according to an embodiment of the disclosure may obtain the ranging start timing information from the ranging start message. The controller 100 may start actual ranging by transmitting a ranging control message at a point in time determined based on the ranging start timing information. The ranging control message may include a ranging parameter. For example, the ranging parameter may include a parameter related to at least one of a ranging method indicating which one of a single-sided two-way ranging (SS-TWR) method and a double-sided two-way ranging (DS-TWR) method is to be used, a ranging block structure, or a number of frames to be used for ranging.

The controller 100 according to an embodiment of the disclosure may transmit a first ranging frame to the controllee 200 and receive a second ranging frame from the controllee 200. A ranging frame refers to a frame transmitted or received between devices to perform ranging. For example, the ranging frame may be a frame including a ranging marker that is information for defining a reference point in time.

The controller 100 may calculate a time period required for the second ranging frame to be transmitted from the controllee 200 to the controller 100, based on the first ranging frame and the second ranging frame. The controller 100 may calculate a propagation time of the second ranging frame from the controllee 200 to the controller 100, based on the first ranging frame and the second ranging frame. The controller 100 may perform ranging for estimating the distance between the controller 100 and the controllee 200, based on the calculated propagation time.

Figure 9:
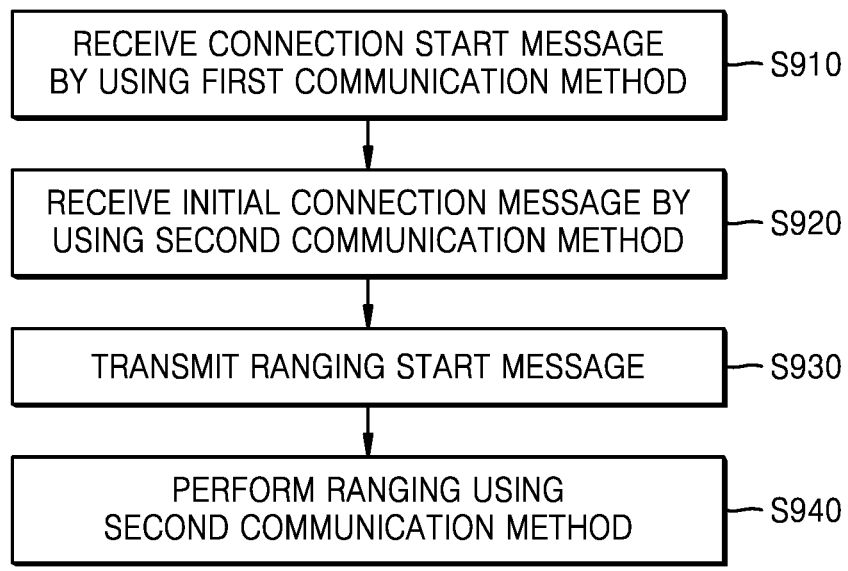
FIG. 9 is a flowchart of an operation method of a controllee according to an embodiment of the disclosure.

FIG. 9 is a flowchart of an operation method of the controllee 200 according to an embodiment of the disclosure.

In operation S910, the controllee 200 according to an embodiment of the disclosure may receive a connection start message related to a second communication method from the controller 100 by using a first communication method. For example, the first communication method may be an out-of-band communication method which is different from the UWB communication method, and the second communication method may be the UWB communication method. For example, the first communication method may be a Bluetooth communication method.

The connection start message related to the second communication method may include at least one of a message identifier or a session identifier.

In one embodiment of the disclosure, the connection start message may include a UWB message identifier and a UWB session identifier. The UWB message identifier may indicate information about a type of a UWB message. For example, the UWB message identifier may be an identifier indicating that a corresponding message is a UWB connection start message. The UWB session identifier may be an identifier of a UWB ranging session.

In operation S920, the controllee 200 according to an embodiment of the disclosure may wait to receive a message by using the second communication method. After receiving the connection start message in operation S910, the controllee 200 may be awake until an initial connection message is received from the controller 100 by using the second communication method. For example, the UWB communication module of the controllee 200 may be activated until the initial connection message is received from the controller 100.

In operation S930, when receiving the initial connection message by using the second communication method, the controllee 200 may transmit a ranging start message to the controller 100.

The controllee 200 according to an embodiment of the disclosure may obtain an index from the initial connection message. A configuration of the initial connection message has been described above with reference to FIG. 8 and thus is not described again here. The controllee 200 may compare the obtained index with a threshold, and identify an operational state of the controller 100, based on a result of the comparison. For example, the controllee 200 may determine that the controller 100 or the controllee 200 is in a high attenuation situation when the obtained index is greater than or equal to the threshold.

In one embodiment of the disclosure, when the controllee 200 determines that the controller 100 and the controllee 200 are in a high attenuation state of a UWB communication signal, the controllee 200 may perform an appropriate operation, based on a result of the determination.

For example, the controllee 200 may inform a user that the controller 100 or the controllee 200 is in a high attenuation situation. The controllee 200 may guide the user to remove an obstacle between the controller 100 and the controllee 200, for example, to take a smart phone out of the user's pocket. The controllee 200 may notify the user of the high attenuation situation through an outputter included in the controllee 200 or through an outputter included in the controller 100. The controllee 200 may transmit the result of the determination indicating the high attenuation situation to the controller 100 so that the controller 100 may notify the user of the controller 100 of the result of the determination.

The controllee 200 according to an embodiment of the disclosure may transmit a ranging start message by using the first communication method or the second communication method. The controllee 200 may transmit a ranging start message including ranging start timing information.

In one embodiment of the disclosure, the ranging start message may include a UWB message identifier, a UWB session identifier, and ranging start timing information. The UWB message identifier may indicate information about a type of a UWB message. For example, the UWB message identifier may be an identifier indicating that a corresponding message is the ranging start message. The UWB session identifier may be an identifier of a UWB ranging session. The ranging start timing information may include information about a point in time at which ranging is expected to be started after the corresponding message. For example, the ranging start timing information may be expressed in ms units.

The controllee 200 may stop waiting to receive a message by using the second communication method for a certain time period determined based on the ranging start timing information. The controllee 200 may deactivate the UWB communication module after transmitting the ranging start message until receiving a ranging control message, thereby reducing power waste.

In operation S940, the controllee 200 according to an embodiment of the disclosure may perform ranging with respect to the controller 100 by using the second communication method.

The controllee 200 according to an embodiment of the disclosure may start actual ranging by receiving the ranging control message from the controller 100. The ranging control message may include a ranging parameter. For example, the ranging parameter may include a parameter related to at least one of a ranging method indicating which one of the SS-TWR method and the DS-TWR method is to be used, a ranging block structure, or a number of frames to be used for ranging.

The controllee 200 according to an embodiment of the disclosure may transmit a first ranging frame to the controller 100 and receive a second ranging frame from the controller 100. A ranging frame refers to a frame transmitted or received between devices to perform ranging. For example, the ranging frame may be a frame including a ranging marker that is information for defining a reference point in time.

The controllee 200 may calculate a time period required for the second ranging frame to be transmitted from the controller 100 to the controllee 200, based on the first ranging frame and the second ranging frame. The controllee 200 may calculate a propagation time of the second ranging frame from the controller 100 to the controllee 200, based on the first ranging frame and the second ranging frame. The controllee 200 may calculate the distance between the controller 100 and the controllee 200, based on the calculated time.

A ranging operation performed between the controller 100 and the controllee 200 will be described with reference to FIGS. 10 and 11 below. According to a ranging control message transmitted from the controller 100, one of the controller 100 and the controllee 200 may be an initiator for transmitting a ranging start message and the other may be a responder responding to the ranging start message.

Figure 10:
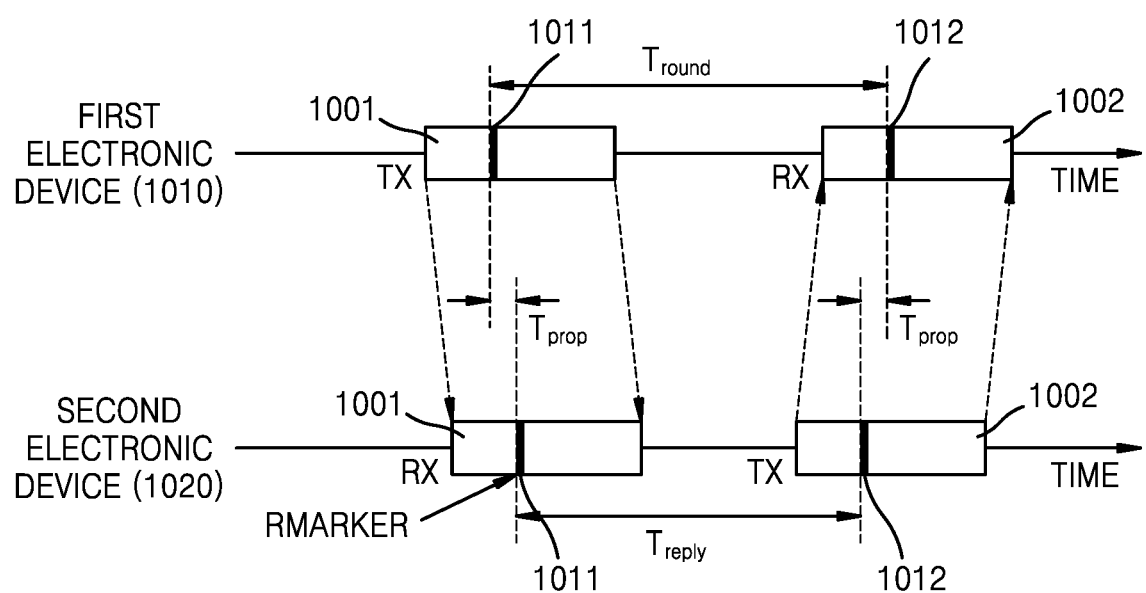
FIG. 10 is a diagram for explaining single-sided two-way ranging (SS-TWR) between electronic devices.
Figure 11:
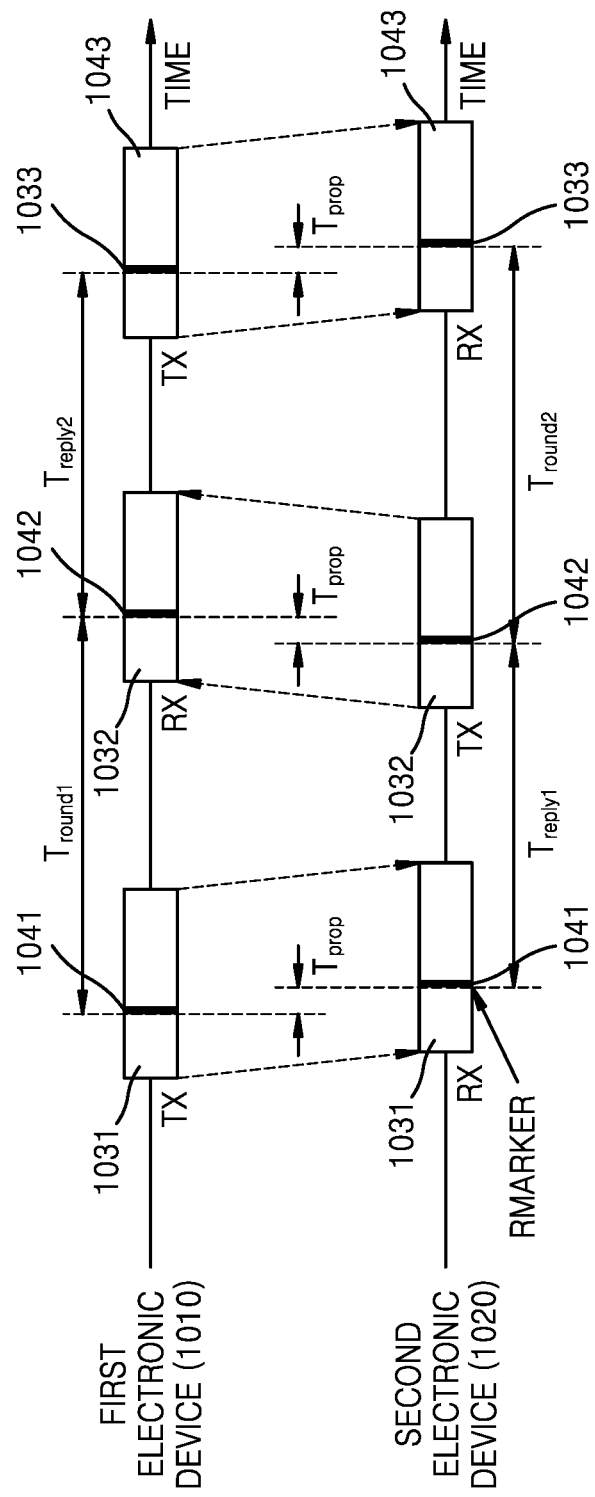
FIG. 11 is a diagram for explaining double-sided two-way ranging (DS-TWR) between electronic devices.

Thus, the controller 100 may correspond to a first electronic device 1010 of FIGS. 10 and 11, and the controllee 200 may correspond to a second electronic device 1020 of FIGS. 10 and 11. However, embodiments of the disclosure are not limited thereto, and the controller 100 may correspond to the second electronic device 1020 of FIGS. 10 and 11 and the controllee 200 may correspond to the first electronic device 1010 of FIGS. 10 and 11.

FIG. 10 is a diagram for briefly explaining an SS-TWR operation of electronic devices. In FIG. 10, the first electronic device 1010 may be referred to as an initiator device and the second electronic device 1020 may be referred to as a responder device.

Referring to FIG. 10, when the first electronic device 1010 transmits the first RFRAME 1001 to the second electronic device 1020, the second electronic device 1020 may measure a point in time when the first RFRAME 1001 is received. The second electronic device 1020 may transmit a second RFRAME 1002 to the first electronic device 1010 and measure a ranging reply time $T_{reply}$. The first electronic device 1010 that receives the second RFRAME 1002 may measure a point in time when the second RFRAME 1002 is received and measure a ranging round time $T_{round}$.

In detail, the first electronic device 1010 may measure a time difference $T_{round}$ between a first RMARKER 1011 included in the first RFRAME 1001 transmitted to the second electronic device 1020 and a second RMARKER 1012 included in the second RFRAME 1002 received from the second electronic device 1020. The second electronic device 1020 may measure a time difference $T_{reply}$ between the first RMARKER 1011 included in the first RFRAME 1001 received from the first electronic device 1010 and the second RMARKER 1012 included in the second RFRAME 1002 transmitted to the first electronic device 1010.

The second electronic device 1020 transmits in a data frame the time difference $T_{reply}$ to the first electronic device 1010 so that the first electronic device 1010 may calculate a time of flight (ToF) $\hat{T}_{prop}$ according to Equation 1 below. The first electronic device 1010 may perform ranging between the first electronic device 1010 and the second electronic device 1020 by multiplying the ToF $\hat{T}_{prop}$ by the speed of light (e.g., 3×10⁸ m/s).

$$\hat{T}_{prop}=\tfrac{1}{2}(T_{round}-T_{reply})$$ [Equation 1]

FIG. 11 is a diagram for explaining DS-TWR between electronic devices. DS-TWR may be performed by transmission of an RFRAME three times in a manner similar to that used to perform SS-TWR described above.

Referring to FIG. 11, when the first electronic device 1010 transmits a first RFRAME 1031 to the second electronic device 1020, the second electronic device 1020 may measure a point in time when the first RFRAME 1031 is received. The second electronic device 1020 may transmit a second RFRAME 1032 to the first electronic device 1010. The second electronic device 1020 may measure a ranging response time $T_{reply1}$. The first electronic device 1010 that receives the second RFRAME 1032 may measure a point in time when the second RFRAME 1032 is received and measure a ranging round time $T_{round1}$.

When the first electronic device 1010 receiving the second RFRAME 1032 transmits a third RFRAME 1043 to the second electronic device 1020, the second electronic device 1020 may measure a point in time when the third RFRAME 1043 is received. The first electronic device 1010 may measure a ranging response time $T_{reply2}$. The second electronic device 1020 receiving the third RFRAME 1043 may measure a point in time when the third RMARKER 1033 is received and measure a ranging round time $T_{round2}$.

In detail, the first electronic device 1010 may measure a time difference $T_{round1}$ between a first RMARKER 1041 included in the first RFRAME 1031 transmitted to the second electronic device 1020 and a second RMARKER 1042 included in the second RFRAME 1032 received from the second electronic device 1020. The second electronic device 1020 may measure a time difference $T_{reply1}$ between the first RMARKER 1041 included in the first RFRAME 1031 received from the first electronic device 1010 and the second RMARKER 1042 included in the second RFRAME 1032 transmitted to the first electronic device 1010.

The second electronic device 1020 may measure a time difference $T_{round2}$ between the second RMARKER 1042 included in the second RFRAME 1032 transmitted to the first electronic device 1010 and a third RMARKER 1033 included in the third RFRAME 1043 received from the first electronic device 1010. The first electronic device 1010 may measure a time difference $T_{reply2}$ between the second RMARKER 1042 included in the second RFRAME 1032 received from the second electronic device 1020 and the third RMARKER 1033 included in the third RFRAME 1043 transmitted to the second electronic device 1020.

The second electronic device 1020 may receive the time differences $T_{round1}$ and $T_{reply2}$ in a data frame from the first electronic device 1010. The second electronic device 1020 may calculate $\hat{T}_{prop}$ according to Equation 2 below and multiply $\hat{T}_{prop}$ by the speed of light (e.g., 3×10⁸ m/s) to measure the distance between the first electronic device 1010 and the second electronic device 1020.

$$\hat{T}_{prop} = \frac{(T_{round1} \times T_{round2} - T_{reply1} \times T_{reply2})}{(T_{round1} + T_{round2} + T_{reply1} + T_{reply2})}$$ [Equation 2]

Figure 12:
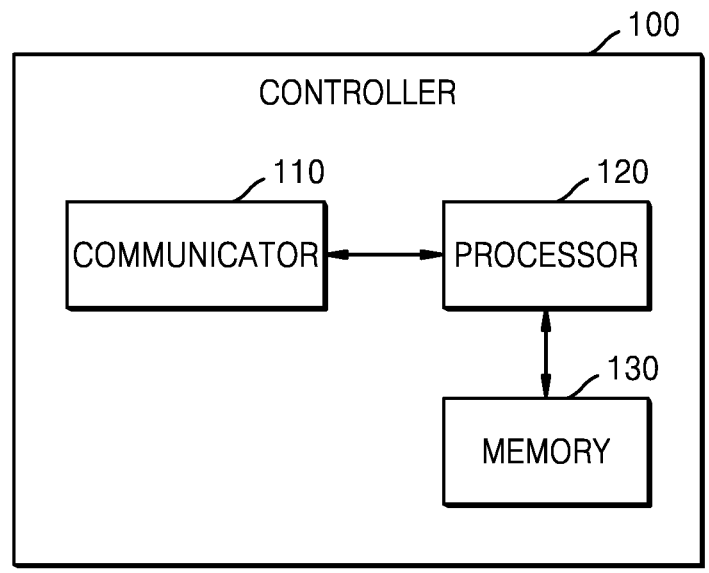
FIG. 12 is a block diagram of a controller according to an embodiment of the disclosure.

FIG. 12 is a block diagram of a controller according to an embodiment of the disclosure. A controller 100 according to various embodiments of the disclosure may be a fixed UE or a mobile UE. Examples of the controller 100 may include, but are not limited to, at least one of a smart phone, a cellular phone, a navigation device, a computer, a laptop computer, a digital broadcasting terminal, an artificial intelligence speaker, a speaker, a personal digital assistant (PDA), a portable multimedia player (PMP), or a tablet PC. The controller 100 may communicate with other devices and/or servers via a network by using a wireless or wired communication method.

Figure 14:
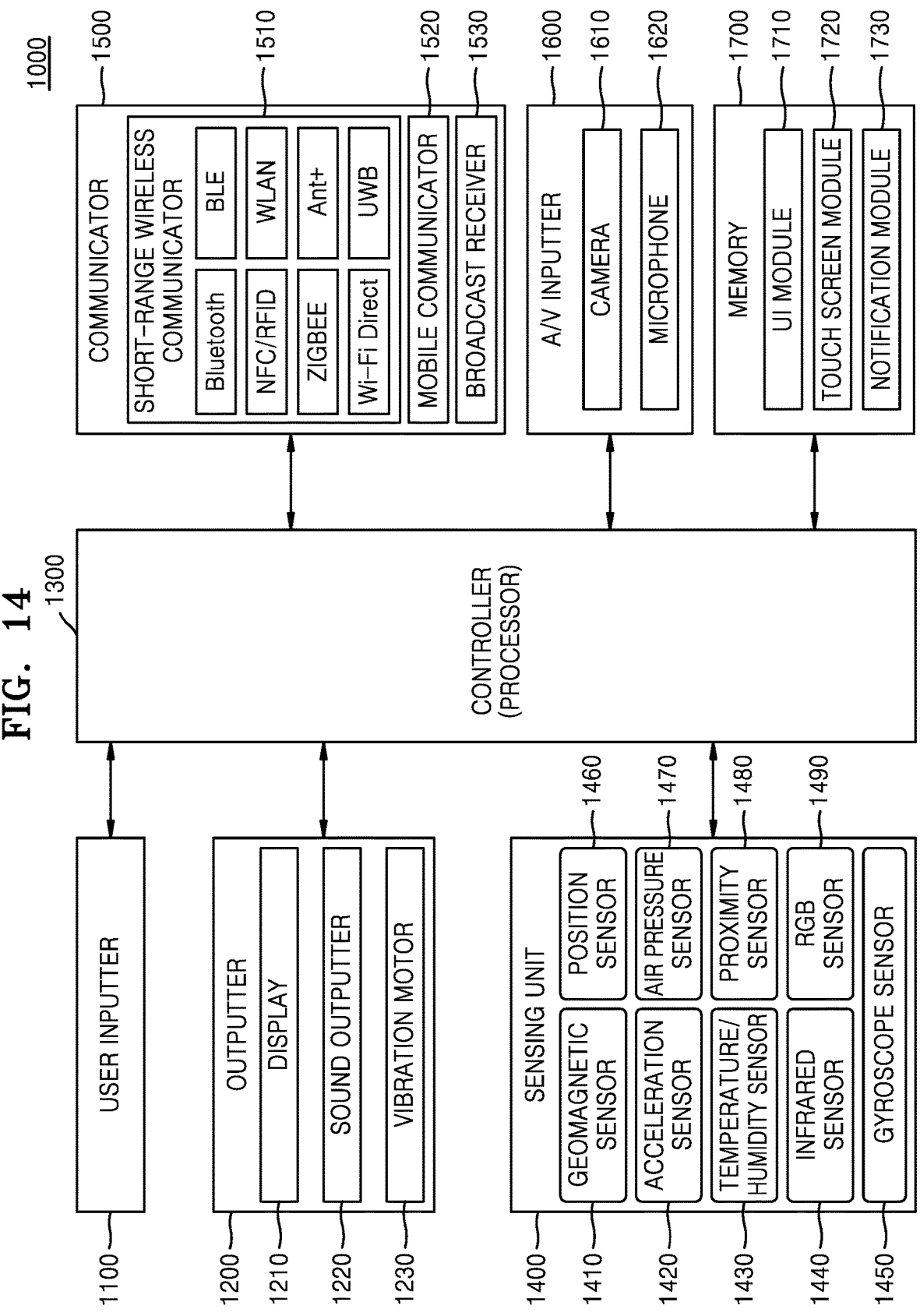
FIG. 14 illustrates a detailed block diagram of an electronic device according to an embodiment of the disclosure.

Referring to FIG. 12, the controller 100 according to various embodiments of the disclosure may include a communicator 110, a processor 120, and a memory 130. However, the controller 100 may be embodied as including more components than all the components illustrated in FIG. 12. For example, as illustrated in FIG. 14, the controller 100 according to some embodiments of the disclosure may include at least one of a user inputter 1100, an outputter 1200, a sensing unit 1400, and an audio/video (AN) inputter 1600.

Although the controller 100 is illustrated as including one processor in FIG. 12, embodiments of the disclosure are not limited thereto and the controller 100 may include a plurality of processors. At least some of operations and functions of the processor 120 described below may be performed by a plurality of processors. The controller 100 illustrated in FIG. 12 may perform an operation method of the controller 100 according to various embodiments of the disclosure, and the descriptions of FIGS. 1 to 11 may apply thereto. Therefore, descriptions of the controller 100 that are the same as those of FIGS. 1 and 11 described above are omitted here.

The communicator 110 according to an embodiment of the disclosure may establish wired or wireless communication with other devices via a network. To this end, the communicator 110 may include a communication module supporting at least one of various wired and wireless communication methods. For example, the communication module may be in the form of a chipset or may be a sticker/barcode (e.g. a sticker with an NFC tag) storing information necessary for communication.

The wireless communication may include, for example, at least one of cellular communication, wireless fidelity (Wi-Fi), Wi-Fi Direct, Bluetooth, ultra-wide band (UWB), or near-field communication (NFC). The wired communication may include, for example, at least one of USB or high-definition multimedia interface (HDMI).

In one embodiment of the disclosure, the communicator 110 may include a communication module for short-range communication. For example, the communicator 110 may include a communication module for establishing various short-range communications such as infrared communication and magnetic secure transmission (MST) communication, as well as UWB, Wi-Fi, Wi-Fi Direct, Bluetooth, and NFC described above.

The communicator 110 according to an embodiment of the disclosure may communicate with the controllee 200 by using a first communication method or a second communication method. For example, the second communication method may be a UWB communication method, and the first communication method may be a communication method different from the second communication method. For example, the first communication method may be a Bluetooth communication method but is not limited thereto.

The processor 120 according to an embodiment of the disclosure controls overall operations of the controller 100 and may include at least one processor such as a CPU or a GPU. The processor 120 may control other components included in the controller 100 to perform UWB ranging.

The communicator 110 according to an embodiment of the disclosure may transmit a connection start message related to the second communication method to the controllee 200 by using the first communication method. The communicator 110 may transmit an initial connection message to the controllee 200 by using the second communication method. The communicator 110 may receive a ranging start message from the controllee 200. When ranging is started, the communicator 110 may transmit or receive at least one frame for ranging to or from the controllee 200 by using the second communication method. The processor 120 according to an embodiment of the disclosure may perform ranging, based on at least one frame transmitted or received through the communicator 110.

The descriptions of FIGS. 4, 10, and 11 may apply to a detailed method of performing ranging by the processor 120 and are not redundantly described here. The descriptions of FIGS. 6 and 8 may apply to a concrete method of controlling the components of the controller 100 to reduce power waste outside a UWB communication range.

The processor 120 according to an embodiment of the disclosure may control the communicator 110 to transmit the connection start message related to the second communication method to the controllee 200 by using the first communication method. For example, the connection start message related to the second communication method may include at least one of a message identifier or a session identifier.

The processor 120 according to an embodiment of the disclosure may control the communicator 110 to transmit the initial connection message to the controllee 200 by using the second communication method. The processor 120 may repeatedly transmit the initial connection message by using the second communication method until a ranging start message is received from the controllee 200. The processor 120 may deactivate a UWB module included in the communicator 110 before a subsequent initial connection message is transmitted after the transmission of the initial connection message to the controllee 200, thereby reducing power consumption caused by an operation of the UWB module in a stand-by mode.

When the initial connection message is repeatedly transmitted at certain intervals by using the second communication method, the processor 120 may change the intervals, based on a movement of the controller 100. For example, the controller 100 may reduce the intervals when a movement of the controller 100 is sensed, and increase the intervals when it is determined that the controller 100 has not moved for a certain time period.

According to an embodiment of the disclosure, the initial connection message may include at least one of information about a type of a UWB message, UWB ranging session information, or an index indicating a number of times the initial connection message is transmitted. The processor 120 may transmit, via the communicator 110, an initial connection message including an index that increases as the number of times the initial connection message is transmitted increases.

Next, the processor 120 according to an embodiment of the disclosure may control the communicator 110 to receive the ranging start message from the controllee 200. The ranging start message may be received using the first communication method or the second communication method. The processor 120 may obtain ranging start timing information from the ranging start message. The processor 120 may control the communicator 110 to transmit a ranging control message at a point in time determined based on the ranging start timing information. The ranging control message may include a ranging parameter.

Figure 13:
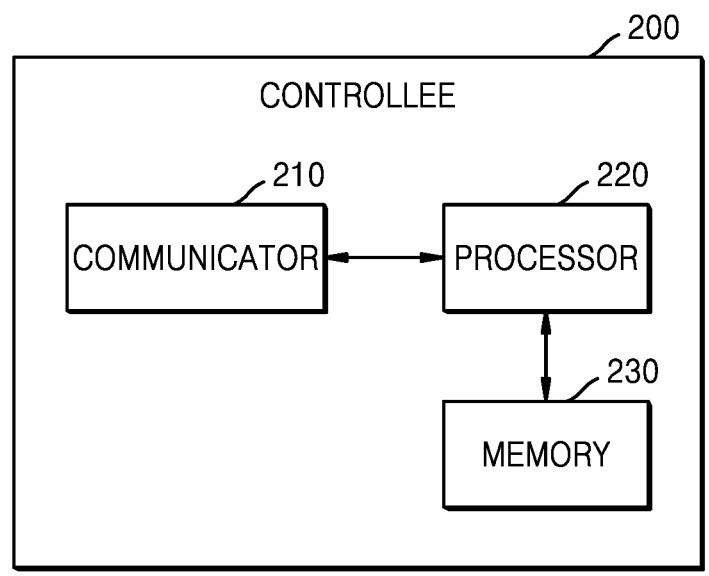
FIG. 13 is a block diagram of a controllee according to an embodiment of the disclosure.

FIG. 13 is a block diagram of a controllee according to an embodiment of the disclosure. A controllee 200 according to various embodiments of the disclosure may be a fixed UE or a mobile UE. Examples of the controllee 200 may include, but are not limited to, at least one of a smart phone, a cellular phone, a navigation device, a computer, a laptop computer, a digital broadcasting terminal, an artificial intelligence speaker, a speaker, a personal digital assistant (PDA), a portable multimedia player (PMP), or a tablet PC. The controllee 200 may communicate with other devices and/or servers via a network by using a wireless or wired communication method.

Referring to FIG. 13, the controllee 200 according to various embodiments of the disclosure may include a communicator 210, a processor 220, and a memory 230. However, the controllee 200 may be embodied as including more components than all the components illustrated in FIG. 13. For example, as illustrated in FIG. 14, according to some embodiments of the disclosure, the controllee 200 may include at least one of a user inputter 1100, an outputter 1200, a sensing unit 1400, or an audio/video (NV) inputter 1600.

Although the controllee 200 is illustrated as including one processor in FIG. 13, embodiments of the disclosure are not limited thereto and the controllee 200 may include a plurality of processors. At least some of operations and functions of the processor 220 described below may be performed by a plurality of processors. The controllee 200 illustrated in FIG. 13 may perform operation methods according to various embodiments of the disclosure and the descriptions of FIGS. 1 to 11 may apply thereto. Therefore, a description of the controllee 200 that is the same as those of FIGS. 1 and 11 described above is omitted here.

The communicator 210 according to an embodiment of the disclosure may establish wired or wireless communication with other devices via a network. To this end, the communicator 210 may include a communication module supporting at least one of various wired and wireless communication methods. For example, the communication module may be in the form of a chipset or may be a sticker/barcode (e.g. a sticker with an NFC tag) storing information necessary for communication.

The wireless communication may include, for example, at least one of cellular communication, wireless fidelity (Wi-Fi), Wi-Fi Direct, Bluetooth, ultra-wide band (UWB), or near-field communication (NFC). The wired communication may include, for example, at least one of USB or high-definition multimedia interface (HDMI).

In one embodiment of the disclosure, the communicator 210 may include a communication module for short-range communication. For example, the communicator 210 may include a communication module for establishing various short-range communications such as infrared communication and magnetic secure transmission (MST) communication, as well as UWB, Wi-Fi, Wi-Fi Direct, Bluetooth, and NFC described above.

The communicator 210 according to an embodiment of the disclosure may communicate with the controller 100 by using a first communication method or a second communication method. For example, the second communication method may be a UWB communication method, and the first communication method may be a communication method different from the second communication method. For example, the first communication method may be a Bluetooth communication method but is not limited thereto.

The processor 120 according to an embodiment of the disclosure controls overall operations of the controllee 200 and may include at least one processor such as a CPU or a GPU. The processor 220 may control other components included in the controllee 200 to perform UWB ranging.

The communicator 210 according to an embodiment of the disclosure may receive a connection start message related to the second communication method from the controller 100 by using the first communication method. The communicator 210 may receive an initial connection message to the controller 100 by using the second communication method. The communicator 210 may transmit a ranging start message from the controller 100. When ranging is started, the communicator 210 may transmit or receive at least one frame for ranging to or from the controller 100 by using the second communication method. The processor 220 according to an embodiment of the disclosure may perform ranging, based on at least one frame transmitted or received through the communicator 210.

The descriptions of FIGS. 4, 10, and 11 may apply to a concrete method of performing ranging by the processor 220 and are not redundantly described here. The descriptions of FIGS. 6 and 8 may apply to a concrete method of controlling the components of the controllee 200 to reduce power waste outside a UWB communication range.

The processor 220 according to an embodiment of the disclosure may control the communicator 210 to receive a connection start message related to the second communication method from the controller 100 by using the first communication method. For example, the connection start message related to the second communication method may include at least one of a message identifier or a session identifier.

When receiving the connection start message, the processor 220 according to an embodiment of the disclosure may activate a communication module supporting the second communication method and wait for reception of an initial connection message. The processor 220 may control the communicator 210 to receive the initial connection message from the controller 100 by using the second communication method.

Next, the processor 220 according to an embodiment of the disclosure may control the communicator 210 to transmit a ranging start message to the controller 100 in response to the initial connection message. The ranging start message may be transmitted using the first communication method or the second communication method. The processor 220 may transmit a ranging start message including ranging start timing information.

The processor 220 may control the communicator 210 to receive a ranging control message at a point in time determined based on the ranging start timing information. After transmitting the ranging start message, the processor 220 may deactivate a UWB module until a point in time determined based on the ranging start timing information. The processor 220 may deactivate the UWB module after transmitting the ranging start message until receiving the ranging control message. The processor 220 may deactivate the UWB module until the point in time determined based on the ranging start timing information, thereby reducing the amount of power consumed by the UWB module in a standby mode.

FIG. 14 illustrates a detailed block diagram of an electronic device according to an embodiment of the disclosure.

A device 1000 illustrated in FIG. 14 may include the same components as the controller 100 of FIG. 12 and the controlee 200 of FIG. 13. For example, a controller 1300 among components illustrated in FIG. 14 may be the same as the processor 120 illustrated in FIG. 12 or the processor 320 illustrated in FIG. 13. A communicator 1500 among the components illustrated in FIG. 14 may be the same as the communicator 110 illustrated in FIG. 12 or the communicator 210 illustrated in FIG. 13. A memory 1700 among the components illustrated in FIG. 14 may be the same as the memory 130 illustrated in FIG. 12 or the memory 230 illustrated in FIG. 13.

The device 1000 of FIG. 14 may perform all the operations and functions of the controller 100 or the controllee 200 described above. Therefore, components of the device 1000 that are not described above will be described below.

Referring to FIG. 14, the device 1000 may include the user inputter 1100, the outputter 1200, the controller 1300, the sensing unit 1400, the communicator 1500, the A/V inputter 1600, and the memory 1700.

The user inputter 1100 refers to means for inputting data by a user to control the device 1000. Examples of the user inputter 1100 may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezo effect-type touch pad, or the like), a jog wheel, a jog switch, etc. The user inputter 1100 may receive a user input necessary for generating conversation information to be provided to a user.

The outputter 1200 may output an audio signal, a video signal, or a vibration signal, and include a display 1210, a sound outputter 1220, and a vibration motor 1230. The outputter 1200 according to an embodiment of the disclosure may notify a user that the device 1000 is in a high attenuation situation. For example, the outputter 1200 may induce the device 1000 to be taken out of the user's pocket for accurate ranging.

The vibration motor 1230 may output a vibration signal. For example, the vibration motor 1230 may output a vibration signal corresponding to an output of audio data or video data (e.g., call signal reception sound, message reception sound, or the like).

The sensing unit 1400 may sense a state of the device 1000 or surrounding conditions of the device 1000 and transmit sensed information to the controller 1300.

The sensing unit 1400 may include, but is not limited to, at least one of a geomagnetic sensor 1410, an acceleration sensor 1420, a temperature/humidity sensor 1430, an infrared sensor 1440, a gyroscope sensor 1450, a position sensor (e.g., a GPS) 1460, an air pressure sensor 1470, a proximity sensor 1480, or an RGB sensor (illuminance sensor) 1490.

The sensing unit 1400 according to an embodiment of the disclosure may sense a movement of the device 1000. The controller 1300 may reduce a transmission interval of an initial connection message when a movement of the device 1000 is sensed, and increase the transmission interval of the initial connection message when a movement of the device 1000 is not sensed for a certain time period. Functions of these sensors are intuitively reasonable by those of ordinary skill in the art from the names thereof and thus a detailed description thereof is omitted here.

The communicator 1500 may include a component for communication with other devices. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth low energy (BLE) communicator, a near-field communicator, a WLAN (Wi-Fi) communicator, a ZigBee communicator, an infrared data association (IrDA) communicator, a WFD (Wi-Fi Direct) communicator, an ultra-wideband (UWB) communicator, an Ant+ communicator, and the like.

The mobile communicator 1520 transmits a radio signal to or receives a radio signal from at least one of a base station, an external UE, or a server via a mobile communication network. Here, the radio signal may include a voice call signal, a video call signal, or various types of data according to transmission or reception a text/multimedia message.

The broadcast receiver 1530 receives a broadcast signal and/or broadcast-related information from the outside through a broadcast channel. The broadcast channel may include a satellite channel and a terrestrial channel. According to an embodiment of the disclosure, the device 1000 may not include the broadcast receiver 1530.

The A/V inputter 1600 is configured to input an audio signal or a video signal, and may include a camera 1610 and a microphone 1620. The camera 1610 may obtain a video frame, such as a still image or a moving picture, through an image sensor in a video call mode or a shooting mode. An image captured by the image sensor may be processed by the controller 1300 or a separate image processor (not shown).

An image frame processed by the camera 1610 may be stored in the memory 1700 or transmitted to the outside through the communicator 1500. Two or more cameras 1610 may be provided according to an embodiment of a UE.

The microphone 1620 receives an external sound signal and converts the external sound signal into electrical voice data. For example, the microphone 1620 may receive a sound signal from an external device or a speaker. The microphone 1620 may use various noise removing algorithms to remove noise generated during receiving an external sound signal.

The memory 1700 may store a program for processing and controlling the controller 1300, and store data input to or output from the device 1000.

The memory 1700 may include at least one type of storage medium among a flash memory type storage medium, a hard disk type storage medium, a multimedia card micro type storage medium, a card type memory (e.g., SD or XD memory), RAM, SRAM, ROM, EEPROM, PROM, magnetic memory, a magnetic disk, and an optical disk.

Programs stored in the memory 1700 may be classified into a plurality of modules, e.g., a user interface (UI) module 1710, a touch screen module 1720, a notification module 1730, and the like, according to functions thereof.

The UI module 1710 may provide a specialized UI, a graphical user interface (GUI), or the like, which is linked to the device 1000 for each application. The touch screen module 1720 may sense a user's touch gesture on a touch screen and transmit information about the touch gesture to the controller 1300. The touch screen module 1720 according to some embodiments of the disclosure may identify and analyze touch code. The touch screen module 1720 may be configured as separate hardware, including a controller.

The notification module 1730 may generate a signal for notifying the occurrence of an event of the device 1000. Examples of events occurring in the device 1000 include call signal reception, message reception, key signal input, schedule notification, and the like.

The embodiments of the disclosure set forth herein may be implemented as a software (S/W) program including instructions stored in a computer-readable storage medium.

The computer refers to a device capable of calling an instruction stored in a storage medium and operating according to the called instruction according to the embodiments of the disclosure set forth herein, and may include an image transmission device and an image receiving device according to the embodiments of the disclosure set forth herein.

The computer-readable storage medium may be provided as a non-transitory storage medium. Here, the term "non-transitory" means that the storage medium does not include a signal and is tangible but does not indicate whether data is stored in the storage medium semi-permanently or temporarily.

Electronic devices or methods according to the embodiments of the disclosure set forth herein may be provided by being included in a computer program product. A computer program product may be traded as a product between a seller and a purchaser.

The computer program product may include a S/W program and a computer-readable storage medium storing the S/W program. For example, the computer program product may include a product (e.g., a downloadable application) in the form of a S/W program distributed electronically by the manufacturer of an electronic device or through an electronic market (e.g., Google Play Store or App Store). For electronic distribution of the computer program product, at least part of the S/W program may be stored in a storage medium or temporarily generated. In this case, the storage medium may be a storage medium of a server of the manufacturer, a server of the electronic market, or a storage medium of a relay server that temporarily stores the S/W program.

The computer program product may include a storage medium of a server or a storage medium of a UE in a system consisting of the server and the UE (e.g., an image transmitting device or an image receiving device). Alternatively, when there is a third device (e.g., a smart phone) capable of establishing communication with the server or the UE, the computer program product may include a storage medium of the third device. Alternatively, the computer program product may include a S/W program transmitted from the server to the UE or the third device or transmitted from the third device to the UE.

In this case, the server, the UE, or the third device may execute the computer program product to perform the methods according to the embodiments of the disclosure set forth herein. Alternatively, two or more among the server, the UE, and the third device may execute the computer program product to the methods according to the embodiments of the disclosure set forth herein in a distributed manner.

For example, the server (e.g., a cloud server or an artificial intelligence server) may execute the computer program product stored in the server to control the UE connected thereto through communication to perform the methods according to the embodiments of the disclosure set forth herein.

As another example, the third device may execute the computer program product to control the UE connected thereto to perform the methods according to the embodiments of the disclosure set forth herein. As a concrete example, the third device may remotely control an image transmitting device or an image receiving device to transmit or receive a packing image.

When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

What is claimed is:

1. An operation method of a first electronic device, the operation method comprising:
    transmitting a connection start message related to a second communication method to a second electronic device by a first communication module using a first communication method;
    transmitting, by a second communication module using the second communication method, an initial connection message including an index, the index being a value indicating a number of times the initial connection message is transmitted by the second communication module using the second communication method;
    waiting for a ranging start message for a predetermined time based on a time point of the transmitting of the initial connection message;
    in case that the ranging start message is not received for the predetermined time, deactivating the second communication module for a time period based on an interval of the initial connection message and activating the second communication module after the time period; and
    in case that the ranging start message is received from the second electronic device, performing ranging with respect to the second electronic device by the second communication module using the second communication method based on the ranging start message,
    wherein the ranging start message includes time information for the performing of the ranging.

2. The operation method of claim 1, wherein the transmitting of the initial connection message comprises repeatedly transmitting the initial connection message at a certain interval by using the second communication method until the first electronic device receives the ranging start message from the second electronic device.

3. The operation method of claim 1, wherein the transmitting of the initial connection message comprises:
    repeatedly transmitting the initial connection message at a certain interval by using the second communication method; and
    changing the certain interval based on a movement of the first electronic device.

4. The operation method of claim 3, wherein the changing of the certain interval comprises:
    reducing the certain interval based on the movement of the first electronic device; and
    increasing the certain interval based on a determination that the first electronic device has not moved for a certain time period.

5. The operation method of claim 1, wherein the second communication method comprises a ultra-wide band (UWB) communication method,
    the first communication method is a communication method different from the second communication method, and
    the initial connection message further comprises at least one of information about a type of a UWB message or UWB ranging session information.

6. The operation method of claim 1, wherein the connection start message related to the second communication method comprises at least one of a message identifier or a session identifier.

7. The operation method of claim 1, wherein the performing of the ranging comprises:
    obtaining ranging start timing information from the ranging start message; and
    transmitting, to the second electronic device, a ranging control message at a point of time determined based on the ranging start timing information,
    wherein the ranging control message comprises a ranging parameter, and
    wherein the ranging parameter comprises a parameter related to at least one of a ranging method, a ranging block structure, or the number of frames to be used for ranging.

8. The operation method of claim 1, wherein the performing of the ranging comprises:
    transmitting a first ranging frame to the second electronic device;
    receiving a second ranging frame from the second electronic device;
    calculating a propagation time of the second ranging frame from the second electronic device to the first electronic device based on the first ranging frame and the second ranging frame; and
    calculating a distance between the first electronic device and the second electronic device based on the calculated propagation time.

9. An operation method of a second electronic device, the operation method comprising:
    receiving a connection start message related to a second communication method from a first electronic device by a first communication module of the second electronic device using a first communication method;
waiting to receive an initial connection message including an index, the index being a value indicating a number of times the initial connection message is transmitted repeatedly by the first electronic device;
in case that the initial connection message is received by a second communication module of the second electronic device using the second communication method, transmitting a ranging start message to the first electronic device; and
performing ranging with respect to the first electronic device by using the second communication method based on the ranging start message,
wherein the ranging start message includes time information for the performing of the ranging, and
wherein the method further comprises deactivating the second communication module of the second electronic device for transmitting the ranging start message for a time period based on the time information included in the ranging start message after the transmitting of the ranging start message, and activing the second communication module of the second electronic device after the time period.

10. The operation method of claim 9, further comprising:
obtaining the index from the initial connection message;
comparing the index with a threshold; and
determining an operational state of the first electronic device based on a result of the comparing.

11. The operation method of claim 10, further comprising transmitting information indicating the operational state to the first electronic device.

12. The operation method of claim 9, wherein the transmitting of the ranging start message comprises:
transmitting the ranging start message including the time information for the performing of the ranging to the first electronic device; and
receiving a ranging control message by using the second communication method after the time period determined based on the time information of the ranging start message, and
the performing of the ranging comprises:
receiving the ranging control message from the first electronic device; and
obtaining a ranging parameter from the ranging control message.

13. The operation method of claim 9, wherein the performing of the ranging comprises:
transmitting a first ranging frame to the first electronic device;
receiving a second ranging frame from the first electronic device;
calculating a propagation time of the second ranging frame from the first electronic device to the second electronic device based on the first ranging frame and the second ranging frame; and
calculating a distance between the first electronic device and the second electronic device based on the calculated propagation time.

14. A first electronic device comprising:
a communicator;
a memory; and
at least one processor configured to execute a program stored in the memory to control an operation of the first electronic device,
wherein the at least one processor is further configured to execute the program stored in the memory to:
control the communicator to transmit a connection start message related to a second communication method to a second electronic device by a first communication module using a first communication method,
transmit an initial connection message including an index by a second communication module using a second communication method, the index being a value indicating a number of times the initial connection message is transmitted repeatedly by the second communication module using the second communication method,
wait for a ranging start message for a predetermined time based on a time point of the transmitting of the initial connection message,
in case that the ranging start message is not received for the predetermined time, deactivate the second communication module for a time period based on an interval of the initial connection message and activate the second communication module after the time period, and
in case that the ranging start message is received from the second electronic device, perform ranging with respect to the second electronic device by the second communication module using the second communication method based on the ranging start message,
wherein the ranging start message includes time information for the performing of the ranging.

15. A second electronic device comprising:
a communicator;
a memory; and
at least one processor configured to execute a program stored in the memory to control an operation of the second electronic device,
wherein the at least one processor is further configured to execute the program stored in the memory to:
control the communicator to receive a connection start message related to a second communication method from a first electronic device by a first communication module of the second electronic device using a first communication method,
wait to receive an initial connection message including an index, the index being a value indicating a number of times the initial connection message is transmitted repeatedly by the first electronic device,
in case that the initial connection message is received by a second communication module of the second electronic device using the second communication method, transmit a ranging start message to the first electronic device, and
perform ranging with respect to the first electronic device by using the second communication method based on the ranging start message,
wherein the ranging start message includes time information for the performing of the ranging, and
wherein the at least one processor is further configured to execute the program stored in the memory to deactivate the second communication module of the second electronic device for transmitting the ranging start message for a time period based on the time information included in the ranging start message after the transmitting of the ranging start message and activate the second communication module of the second electronic device after the time period.

16. A non-transitory computer-readable recording medium storing a program for executing the method of claim 1.

17. A non-transitory computer-readable recording medium storing a program for executing the method of claim 9.

\* \* \* \* \*